(12) United States Patent
Shin

(10) Patent No.: US 10,324,341 B2
(45) Date of Patent: Jun. 18, 2019

(54) LIQUID CRYSTAL DISPLAY

(71) Applicant: SAMSUNG DISPLAY CO., LTD., Yongin, Gyeonggi-do (KR)

(72) Inventor: Kyoung Ju Shin, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/871,566

(22) Filed: Jan. 15, 2018

(65) Prior Publication Data

US 2018/0196320 A1    Jul. 12, 2018

Related U.S. Application Data

(62) Division of application No. 14/479,527, filed on Sep. 8, 2014, now Pat. No. 9,904,124.

(30) Foreign Application Priority Data

Jan. 17, 2014    (KR) .................. 10-2014-0006310

(51) Int. Cl.
    *G02F 1/1343*    (2006.01)
(52) U.S. Cl.
    CPC ............ *G02F 1/134363* (2013.01); *G02F 2001/134318* (2013.01)
(58) Field of Classification Search
    CPC ........................................ G02F 1/134363
    See application file for complete search history.

(56) References Cited

U.S. PATENT DOCUMENTS

| | | | |
|---|---|---|---|
| 8,436,972 B2 | 5/2013 | Arai et al. | |
| 2009/0262286 A1 | 10/2009 | Nishida | |
| 2013/0271683 A1 | 10/2013 | Jang et al. | |
| 2014/0232973 A1* | 8/2014 | Sakurai | G02F 1/1337 349/123 |

FOREIGN PATENT DOCUMENTS

| | | |
|---|---|---|
| JP | 2005257883 A | 9/2005 |
| JP | 2006113099 A | 4/2006 |
| KR | 1020090125326 A | 12/2009 |
| KR | 1020090126466 A | 12/2009 |
| KR | 1020130115899 A | 10/2013 |
| KR | 1020140102348 A | 8/2014 |
| KR | 1020150026309 | 3/2015 |

* cited by examiner

*Primary Examiner* — Lucy P Chien
(74) *Attorney, Agent, or Firm* — Cantor Colburn LLP

(57) ABSTRACT

A liquid crystal display includes a first substrate, a gate line disposed on an upper portion of the first substrate, a gate insulating layer disposed on the gate line, a semiconductor layer disposed on the gate insulating layer, a data line and a drain electrode disposed on the semiconductor layer, a passivation layer which covers the data line and the drain electrode and defines a contact hole which exposes a part of the drain electrode, a common electrode provided at an upper portion of the passivation layer and having a planar structure, a pixel electrode electrically connected to the drain electrode through the contact hole and including a plurality of pixel branch electrodes, and a second substrate corresponding to the first substrate, where an opening is defined in the common electrode at a position which corresponds to a middle region of the plurality of pixel branch electrodes.

10 Claims, 22 Drawing Sheets

LIQUID CRYSTAL DISPLAY

This application is a divisional of U.S. patent application Ser. No. 14/479,527, filed on Sep. 8, 2014 which claims priority to Korean Patent Application No. 10-2014-0006310, filed on Jan. 17, 2014, and all the benefits accruing therefrom under 35 U.S.C. § 119, the entire contents of which are incorporated herein by reference.

BACKGROUND

(a) Field

The invention relates to a liquid crystal display.

(b) Description of the Related Art

A liquid crystal display ("LCD") is currently one of the most widely used flat panel displays, and is a display device that adjusts an amount of transmitted light by applying a voltage to an electrode and rearranging liquid crystal molecules of a liquid crystal layer.

The LCD has a merit in that the LCD is easily manufactured to be thin, but has a drawback in that side visibility is poor compared to front visibility, and as a result, in order to overcome the drawback, various methods of arranging and driving the liquid crystal have been developed. An LCD, in which a pixel electrode and a common electrode are disposed on one substrate, attracts attention as a method of implementing a wide viewing angle.

In such an LCD, at least one of two field generating electrodes of the pixel electrode and the common electrode has a plurality of cutouts and has a plurality of branch electrodes defined by the plurality of cutouts.

Liquid crystal molecules are arranged and an amount of transmitted light is controlled by an electric field generated between a field generating electrode including a plurality of branch electrodes and another field generating electrode in a planar form.

SUMMARY

When an external force is applied to a liquid crystal display ("LCD"), liquid crystal molecules undergo declination so the inclination of the liquid crystal molecules above a boundary of a domain is not self-restored, and a luminance difference is generated at a portion where the inclination normally moves.

The invention has been made in an effort to provide an LCD for defining an opening in a boundary of a common electrode or a pixel electrode at which a direction of liquid crystal molecules of the LCD becomes different to increase a horizontal electric field between the common electrode and the pixel electrode, control a horizontal movement of liquid crystal molecules caused by an external force, and effectively reduce deterioration of luminance by a movement of liquid crystal molecules.

An exemplary embodiment of the invention provides an LCD including a first substrate, a gate line disposed on an upper portion of the first substrate upper portion, a gate insulating layer disposed on the gate line, a semiconductor layer disposed on the gate insulating layer, a data line and a drain electrode disposed on the semiconductor layer, a passivation layer which covers the data line and the drain electrode and defines a contact hole for exposing a part of the drain electrode therein, a common electrode provided at an upper portion of the passivation layer and having a planar structure, a pixel electrode electrically connected to the drain electrode through the contact hole and including a plurality of pixel branch electrodes, and a second substrate corresponding to the first substrate, where an opening is defined in a common electrode at a position that corresponds to a middle region of a pixel branch electrode of the plurality of pixel branch electrodes.

The pixel branch electrode includes a first curved portion, and a second curved portion which defines an angle that is greater than that of the first curved portion and provided on one side of the pixel branch electrode in the middle region of the pixel branch electrode.

The first curved portion defines an angle of about 3 degrees (°) to about 7°, and the second curved portion defines an angle of about 10° to about 45°.

The common electrode opening includes a V-shaped first lateral side and a V-shaped second lateral side, and an angle of the V shape corresponds to an angle of the second curved portion of the pixel branch electrode.

The common electrode opening includes a V-shaped first lateral side and a V-shaped second lateral side, and a difference between an angle of the V shape and an angle of the second curved portion of the pixel branch electrode is less than about 5°.

Another embodiment of the invention provides an LCD including a first substrate, a gate line disposed on an upper portion of the first substrate, a gate insulating layer disposed on the gate line, a semiconductor layer disposed on the gate insulating layer, a data line and a drain electrode disposed on the semiconductor layer, a passivation layer which covers the data line and the drain electrode and defines a contact hole for exposing a part of the drain electrode therein, a common electrode provided at an upper portion of the passivation layer and having a planar structure, a pixel electrode electrically connected to the drain electrode through the contact hole and including a plurality of pixel branch electrodes, and a second substrate corresponding to the first substrate, where one end portion of a pixel branch electrode of the plurality of pixel branch electrodes is separated from one end portion of another pixel branch electrode of the plurality of pixel branch electrodes, and an opening is defined in the common electrode at a position that corresponds to the separated one end portion of the pixel branch electrode.

The pixel branch electrode includes a first curved portion, a second curved portion defining an angle that is greater than that of the first curved portion and is provided on respective sides of the pixel branch electrode in a middle region of the pixel branch electrode, the separated one end portion of the pixel branch electrode is bent at a same angle as the second curved portion, and the first curved portion defines an angle of about 3° to about 7° and the second curved portion defines an angle of about 10° to about 45°.

The common electrode opening is provided to be parallel with a direction in which the separated one end portion of the pixel branch electrode is bent, and a horizontal width of the common electrode opening is greater than a width of the pixel branch electrode.

Another embodiment of the invention provides an LCD including a first substrate, a gate line disposed on an upper portion of the first substrate, a gate insulating layer disposed on the gate line, a semiconductor layer disposed on the gate insulating layer, a data line and a drain electrode disposed on the semiconductor layer, a passivation layer which covers the data line and the drain electrode and defines a contact hole for exposing a part of the drain electrode therein, a common electrode provided at an upper portion of the passivation layer and having a planar structure, a pixel electrode electrically connected to the drain electrode through the contact hole and including a plurality of pixel branch electrodes, and a second substrate corresponding to the first substrate, where one end portion of a pixel branch electrode of the plurality of pixel branch electrodes are separated from one end portion of another pixel branch electrode of the plurality of pixel branch electrodes, and an opening is defined in the common electrode a position that corresponds to at least one of a middle region of the pixel branch electrode, the separated one end portion, and another connected one end portion.

The pixel electrode includes a first curved portion, a second curved portion defining an angle that is greater than that of the first curved portion is disposed on one side of the pixel branch electrode in a middle region of the pixel branch electrode, the separated one end portion of the pixel branch electrode are bent at a same angle as the second curved portion, the first curved portion defines an angle of about 3° to about 7°, and the second curved portion defines an angle of about 10° to about 45°.

A common electrode opening defined in the middle region of the pixel electrode includes a first lateral side and a second lateral side, the V-shaped angle of the V-shaped first lateral side and the V-shaped second lateral side corresponds to the angle of the second curved portion of the pixel electrode, the common electrode opening defined at the separated one end portion of the pixel electrode is provided in parallel with a direction in which the separated one end portion of the pixel branch electrode is bent, and a horizontal width of the opening is greater than a width of the pixel branch electrode.

Another embodiment of the invention provides an LCD including a first substrate, a gate line disposed on an upper portion of the first substrate, a gate insulating layer disposed on the gate line, a semiconductor layer disposed on the gate insulating layer, a data line and a drain electrode disposed on the semiconductor layer, a pixel electrode provided to contact a part of the drain electrode and having a planar structure, a passivation layer which covers the data line, the drain electrode, and the pixel electrode, a common electrode provided at an upper portion of the passivation layer, and including a plurality of common branch electrodes, and a second substrate corresponding to the first substrate, where an opening is defined in the pixel electrode at a position that corresponds to a middle region of the common branch electrode.

The common branch electrode includes a first curved portion, and a second curved portion defining an angle that is greater than that of the first curved portion disposed on one side of the common branch electrode in the middle region of the common branch electrode, where the first curved portion defines an angle of about 3° to about 7°, and the second curved portion defines an angle of about 10° to about 45°.

The pixel electrode opening includes a V-shaped first lateral side and a V-shaped second lateral side, and the V-shaped angle is the same as the angle of the common electrode second curved portion or a difference between the V-shaped angle and the angle of the second curved portion is less than about 5°.

Another embodiment of the invention provides an LCD including a first substrate, a gate line disposed on an upper portion of the first substrate, a gate insulating layer disposed on the gate line, a semiconductor layer disposed on the gate insulating layer, a data line and a drain electrode disposed on the semiconductor layer, a pixel electrode provided to contact a part of the drain electrode and having a planar structure, a passivation layer which covers the data line, the drain electrode, and the pixel electrode, a common electrode provided at an upper portion of the passivation layer, and including a plurality of common branch electrodes, and a second substrate corresponding to the first substrate, where one end portions of a common branch electrode of the plurality of common branch electrodes are separated from one end portion of another common branch electrode of the plurality of common branch electrodes, and an opening is defined in the pixel electrode at a position that corresponds to the separated one end portion of the common branch electrode.

The common branch electrode includes a first curved portion, a second curved portion defining an angle that is greater than that of the first curved portion is disposed on respective sides of the common branch electrode in the middle region of the common branch electrode, and one end portion of the common branch electrode is bent at a same angle of the second curved portion.

The pixel electrode opening is provided in parallel with a direction in which one end portion of the pixel branch electrode is bent, and a horizontal width of the opening is greater than a width of the common branch electrode.

Another embodiment of the invention provides an LCD including a first substrate, a gate line disposed on an upper portion of the first substrate, a gate insulating layer disposed on the gate line, a semiconductor layer disposed on the gate insulating layer, a data line and a drain electrode disposed on the semiconductor layer, a pixel electrode provided to contact a part of the drain electrode and having a planar structure, a passivation layer which covers the data line, the drain electrode, and the pixel electrode, a common electrode disposed at an upper portion of the passivation layer, and including a plurality of common branch electrodes, and a second substrate corresponding to the first substrate, where end one portion of a common branch electrode of the plurality of common branch electrodes are separated from one end portion of another common branch electrode of the plurality of common branch electrodes, and an opening defined in the pixel electrode a position that corresponds to at least one of a middle region of the common branch electrode, the separated one end portion, and another connected one end portion.

The common branch electrode includes a first curved portion, a second curved portion defining an angle that is greater than that of the first curved portion is disposed on one side of the common branch electrode in the middle region of the common branch electrode, the separated end portion of the common branch electrode are bent at a same angle of the second curved portion, the first curved portion defines an angle of about 3° to about 7°, and the second curved portion defines an angle of about 10° to about 45°.

The pixel electrode opening defined in the middle region of the common electrode includes a V-shaped first lateral side and a V-shaped second lateral side, the V-shaped angle is the same as the angle of the second curved portion of the common electrode, the pixel electrode opening defined at the separated end portion of the common electrode is provided in parallel with a direction in which the separated one end portion of the common branch electrode is bent, and a horizontal width of the opening is greater than a width of the pixel branch electrode.

According to the embodiments of the invention, the LCD defines the opening in the common electrode or the pixel electrode of the boundary region for changing the direction of the liquid crystal molecules to increase the horizontal electric field between the common electrode and the pixel electrode and control the horizontal movement of liquid crystal molecules. Further, the opening is defined to eliminate the conventionally provided notch and thereby improve the problem of a reduction of transmittance caused by the notch.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 16A shows transmission for Comparative Example 1, FIG. 16B shows transmission for Exemplary Embodiment 1, FIG. 16C shows transmission for Exemplary Embodiment 2, FIG. 16D shows transmission for Exemplary Embodiment 3, and FIG. 16E shows transmission for Exemplary Embodiment 5.

DETAILED DESCRIPTION

Figure 1:
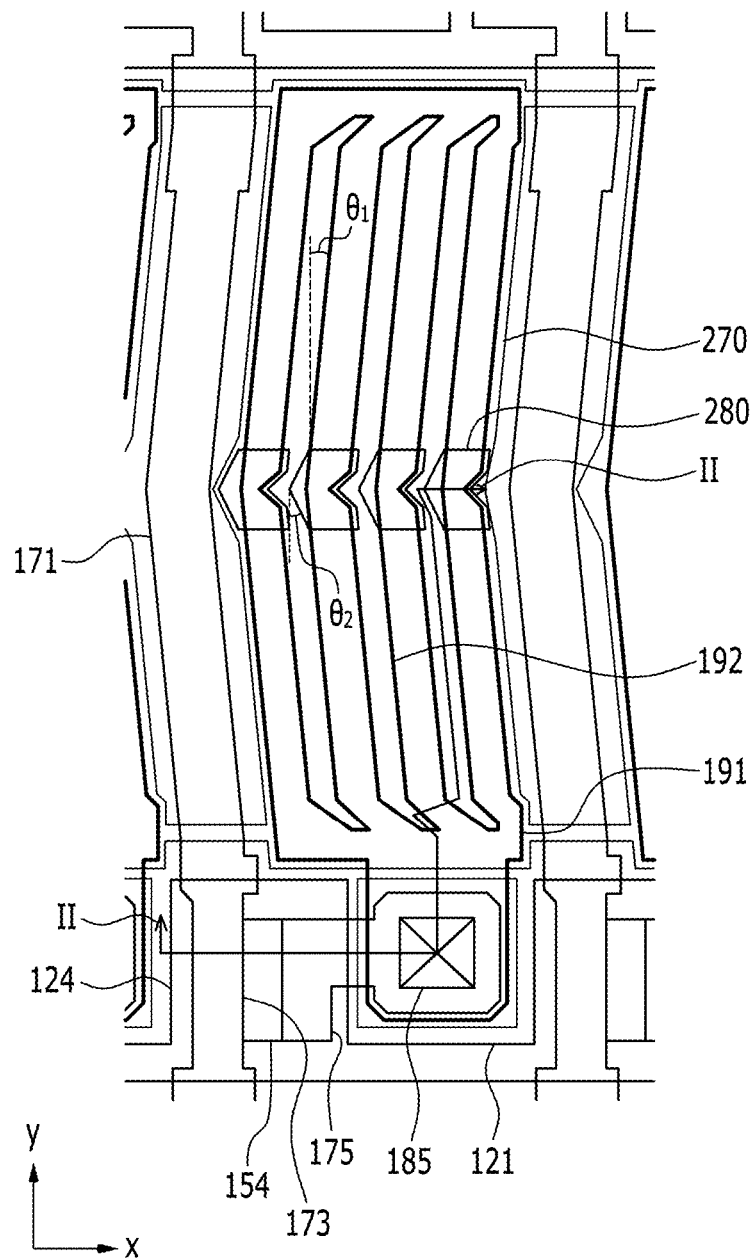
FIG. 1 shows a plan view of an exemplary embodiment of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A liquid crystal display ("LCD") according to an exemplary embodiment of the invention will now be described in detail with reference to accompanying drawings.

An LCD according to an exemplary embodiment of the invention will now be described with reference to FIGS. 1 and 2. FIG. 1 shows a plan view of an LCD according to an exemplary embodiment of the invention, and FIG. 2 shows a cross-sectional view of an LCD according to an exemplary embodiment of the invention shown in FIG. 1 taken along line II-II.

Figure 2:
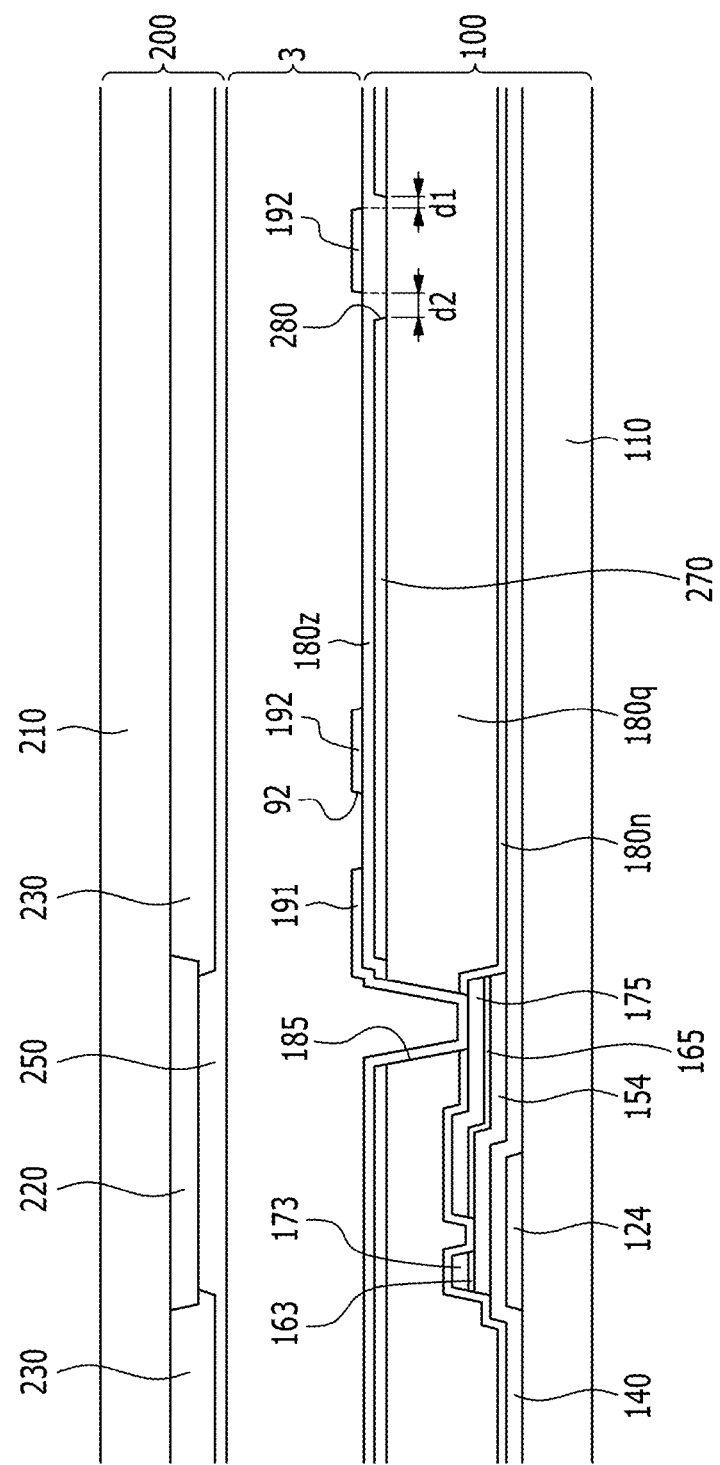
FIG. 2 shows a cross-sectional view of an exemplary embodiment of an LCD according to the invention shown in FIG. 1 taken along line II-II.

Referring to FIGS. 1 and 2, the LCD includes a lower panel 100 and an upper panel 200 facing each other, and a liquid crystal layer 3 injected therebetween.

The lower panel 100 will now be described.

A gate conductor including a gate line 121 is disposed on an insulation substrate 110 including transparent a material such as a glass or a plastic, for example.

The gate line 121 includes a gate electrode 124 and a wide end portion (not shown) for contact with another layer or an external driving circuit. In an exemplary embodiment, the gate line 121 may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), and the like. In another exemplary embodiment, the gate line 121 may have a multilayer structure including at least two conductive layers with different physical properties.

In an exemplary embodiment, a gate insulating layer 140 including a silicon nitride (SiNx) or a silicon oxide (SiOx) is disposed on the gate conductor 121. In an exemplary embodiment, the gate insulating layer 140 may have a multilayer structure including at least two insulating layers with different physical properties.

A semiconductor 154 including amorphous silicon or polysilicon is disposed on the gate insulating layer 140. In an exemplary embodiment, the semiconductor 154 may include an oxide semiconductor.

Ohmic contacts 163 and 165 are disposed on the semiconductor 154. In an exemplary embodiment, the ohmic contacts 163 and 165 may include a material such as n+ hydrogenated amorphous silicon in which an n-type impurity, such as phosphorus, is doped at a high concentration, or a silicide. The ohmic contacts 163 and 165 may provide as a pair disposed on the semiconductor 154. In an exemplary embodiment, when the semiconductor 154 is an oxide semiconductor, the ohmic contacts 163 and 165 may be omitted.

A data conductor including a data line 171 including a source electrode 173 and a drain electrode 175 is disposed on the ohmic contacts 163 and 165 and the gate insulating layer 140.

The data line 171 includes a wide end portion (not shown) for contact with another layer or an external driving circuit.

The data line 171 transmits a data signal and is extended in a substantially perpendicular direction crossing the gate line 121.

In an exemplary embodiment, the data line 171 may have a first curved portion having a curved shape to obtain maximum transmittance of the LCD, and first curved portions may meet each other at an intermediate region of the pixel area and provide a V shape in a plan view, for example.

The first curved portion of the data line 171 may be bent by about 3 degrees (°) to about 7° with respect to a perpendicular reference line y (a reference line extending in the y direction) that defines an angle of about 90° with the direction (x direction) in which the gate line 121 is extended.

The source electrode 173 is a part of the data line 171 and is disposed on the same line as the data line 171. The drain electrode 175 is provided to be parallel with the source electrode 173. Therefore, the drain electrode 175 is parallel with a part of the data line 171.

The gate electrode 124, the source electrode 173, and the drain electrode 175 provide a single thin film transistor ("TFT") together with the semiconductor 154, and a channel of the thin film transistor is disposed on the semiconductor 154 between the source electrode 173 and the drain electrode 175.

In an exemplary embodiment, the data line 171 and the drain electrode 175 may preferably include a refractory metal such as molybdenum, chromium, tantalum, titanium or an alloy thereof, for example, and the data line 171 and the drain electrode 175 may have a multilayer structure including a refractory metal layer (not shown) and a low resistance conductive layer (not shown). In an exemplary embodiment, the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer, for example. However, the invention is not limited thereto, and the data line 171 and the drain electrode 175 may include various metals or conductors in addition to the aforementioned structures. In an exemplary embodiment, a width of the data line 171 may be about 3.5 micrometers (μm)±0.75 μm.

A first passivation layer 180n is disposed on the data conductors 171, 173, and 175, the gate insulating layer 140, and an exposed portion of the semiconductor 154. In an exemplary embodiment, the first passivation layer 180n may include an organic insulating material or an inorganic insulating material.

A second passivation layer 180q is disposed on the first passivation layer 180n. In another exemplary embodiment, the second passivation layer 180q may be omitted. In an exemplary embodiment, the second passivation layer 180q may be a color filter. In an exemplary embodiment, when the second passivation layer 180q is a color filter, the second passivation layer 180q may uniquely express one of primary colors which include red, green, and blue, or yellow, cyan, and magenta, for example. Although not shown, in an exemplary embodiment, the color filter may further include a color filter for displaying mixed colors of the primary colors or white, for example.

A common electrode 270 is disposed on the second passivation layer 180q. In an exemplary embodiment, the common electrode 270 with a planar shape may be disposed on the entire surface of the insulation substrate 110 as a whole plate, and an opening (not shown) may be defined in a region corresponding to a periphery of the drain electrode 175. That is, the common electrode 270 may have a platetype planar shape. In an exemplary embodiment, an opening 280 may be defined in the common electrode 270 corresponding to a center region of the pixel electrode.

That is, the common electrode 270 does not overlap the pixel electrode in the center region of the pixel electrode because of the opening 280. The opening 280 will be further described later.

Common electrodes 270 provided to adjacent pixels are connected to each other and receive a predetermined common voltage supplied from outside of the display area.

A third passivation layer 180z is disposed on the common electrode 270. In an exemplary embodiment, the third passivation layer 180z may be provided with an organic insulating material or an inorganic insulating material.

A pixel electrode 191 is disposed on the third passivation layer 180z. The pixel electrode 191 includes a curved edge that is substantially parallel with the first curved portion of the data line 171. A plurality of cutouts 92 is defined in the pixel electrode 191, and the pixel electrode 191 includes a plurality of pixel branch electrodes 192 defined by the cutouts 92.

Referring to FIG. 1, the pixel electrode 191 includes a curved portion that is substantially parallel with the first curved portion of the data line 171, and curved portions of the pixel electrode 191 may meet it in the middle region of the pixel area to provide a V shape, for example. An angle of the curved portion of the pixel electrode 191 is similar to the first curved portion of the data line 171. That is, the angle of the first curved portion of the pixel electrode 191 may be about 3° to about 7°. Referring to FIG. 1, the angle of the first curved portion of the pixel electrode 191 is shown as $\theta_1$. The angle $\theta_1$ may be about 3° to about 7°, and preferably about 3° to about 5°.

The pixel branch electrode 192 may further include a second curved portion that is bent to have a predetermined angle with respect to the first curved portion in the middle region. The second curved portion is bent to have a predetermined angle with respect to the first curved portion, and the second curved portion may be bent to have the angle of about 7° to about 15° with respect to the first curved portion.

The second curved portion is provided to one side of the pixel branch electrode 192. That is, regarding one pixel branch electrode 192, a second curved portion is provided to one side but not to the other side. Since the second curved portion is provided inside the pixel branch electrode 192, the width of the pixel branch electrode 192 in the middle region is reduced by the second curved portion.

The opening 280 is defined in the common electrode 270 that corresponds to a middle region of the pixel electrode, that is, a region in which the second curved portion is provided. That is, the common electrode 270 does not overlap the pixel electrode in the region in which the second curved portion of the pixel electrode is provided because of the opening 280.

The number of openings 280 may be same with that of pixel branch electrodes 192. A shape of the opening 280 is similar to a shape of the pixel electrode 191 provided in the middle region. In an exemplary embodiment, a width of the opening 280 is greater than a width of the pixel branch electrode 192.

In detail, the opening 280 includes a first lateral side having a V shape with a predetermined angle, a second lateral side that is smaller than the first lateral side and has a V shape with a predetermined angle, and an upper side and a lower side for connecting the first lateral side and the second lateral side on a straight line. The angle of the V-shaped first lateral side corresponds to or is very similar to the angle of the V-shaped second lateral side. In detail, a difference between the angle of the V-shaped first lateral side and the angle of the V-shaped second lateral side may be less than about 2°. However, in other exemplary embodiments, the angle of the second lateral side may be much greater than the angle of the first lateral side depending on the case. The angle of the second lateral side may be greater than the angle of the first lateral side by about 2° to about 10°. In the illustrated exemplary embodiment, an opening having the first lateral side and the second lateral side which have the same angle will be described.

The angle $\theta_2$ of the first lateral side and the second lateral side of the opening is similar to the angle of the second curved portion of the pixel branch electrode 192. Therefore, the second lateral side of the opening that corresponds to one lateral side on which the second curved portion of the pixel branch electrode 192 is provided is similar to the angle of the second curved portion of the pixel branch electrode 192, thereby a distance from the second lateral side of the opening to the pixel branch electrode 192 is relatively shorter and uniform compared to the other side of the opening (i.e., the first lateral side of the opening).

On the contrary, the first lateral side of the opening is provided on one side on which the first curved portion of the pixel branch electrode 192 is disposed, and the angle of the first lateral side of the opening is greater than the angle of the first curved portion of the pixel electrode. Therefore, the distance from an edge of the first lateral side of the opening to the pixel branch electrode 192 is relatively greater than that of the opposite side of the opening (i.e., the second lateral side of the opening).

Referring to FIG. 2, an opening is defined in the common electrode 270 below the pixel branch electrode 192 disposed in the middle region of the opening. Therefore, the pixel branch electrode 192 is separated from the common electrode 270 by distances d2 and d1.

The distance d2 of FIG. 2 is a distance between the edge of the first lateral side of the opening and one side on which the first curved portion of the pixel branch electrode 192 is disposed. The distance d1 is a distance between the edge of the second lateral side of the opening and one side on which the second curved portion of the pixel branch electrode 192 is disposed. As described above, the distance d2 is longer than the distance d1.

A first contact hole 185 exposing a drain electrode 175 is defined in the first passivation layer 180n, the second passivation layer 180q, and the third passivation layer 180z. The pixel electrode 191 is physically and electrically connected to the drain electrode 175 through the first contact hole 185, and receives a voltage from the drain electrode 175.

Although not shown, in an exemplary embodiment, an alignment layer is applied to the pixel electrode 191 and the third passivation layer 180z, the alignment layer may be a horizontal alignment layer, and may be rubbed in a predetermined direction. However, according to an LCD according to another exemplary embodiment of the invention, the alignment layer may include a photoreactive material, for example, and may be optically aligned.

The upper panel 200 will now be described.

A light blocking member 220 is disposed on an insulation substrate 210 including a transparent material such as a glass or a plastic. The light blocking member 220, also called a black matrix, prevents light leakage.

A plurality of color filters 230 is disposed on the substrate 210. In an exemplary embodiment, when the second passivation layer 180q of the lower panel 100 is a color filter, the color filter 230 of the upper panel 200 may be omitted. Further, the light blocking member 220 of the upper panel 200 may be disposed on the lower panel 100.

An overcoat 250 is disposed on the color filter 230 and the light blocking member 220. In an exemplary embodiment, the overcoat 250 may include an (organic) insulating material, and prevents exposure of the color filter 230 and provides a flat side. In another exemplary embodiment, the overcoat 250 may be omitted.

In an exemplary embodiment, an alignment layer may be disposed on the overcoat 250.

In an exemplary embodiment, the liquid crystal layer 3 includes a nematic liquid crystal material having positive dielectric anisotropy, for example. In an exemplary embodiment, the liquid crystal molecules of the liquid crystal layer 3 are arranged so that a direction of a long axis thereof is parallel to the display panels 100 and 200, and the liquid crystal layer has a structure in which the direction of the long axis thereof is twisted about 90° from a rubbing direction of the alignment layer of the lower panel 100 to the upper panel 200 in a spiral shape, for example.

The pixel electrode 191 receives a data voltage from the drain electrode 175, and the common electrode 270 receives a common voltage having a predetermined level from a common voltage application part disposed outside the display region.

The pixel electrode 191 and the common electrode 270, which are field generating electrodes, generate an electric field, so that the liquid crystal molecules of the liquid crystal layer 3 positioned on the two electrodes 191 and 270 are rotated in a direction parallel to a direction of the electric field. As described above, according to the determined rotation direction of the liquid crystal molecules, polarization of light passing through the liquid crystal layer is changed.

The liquid crystal display has the opening 280 defined in the region of the common electrode 270 that corresponds to a refraction portion of the pixel electrode. That is, the common electrode 270 does not overlap the pixel electrode in the refraction portion of the pixel electrode because of the opening 280.

The opening 280 increases a horizontal electric field between the common electrode 270 and the pixel electrode thereby controlling disclination of liquid crystal molecules of the LCD and preventing deterioration of luminance caused by the disclination.

Further, a notch of the pixel electrode conventionally required for controlling disclination of liquid crystal molecules may be eliminated, thus solving the problem of a reduction of transmittance caused by the notch.

An effect of an increase of a horizontal electric field of an LCD according to an exemplary embodiment of the invention will now be described with reference to FIGS. 3 to 6.

Figure 3A:
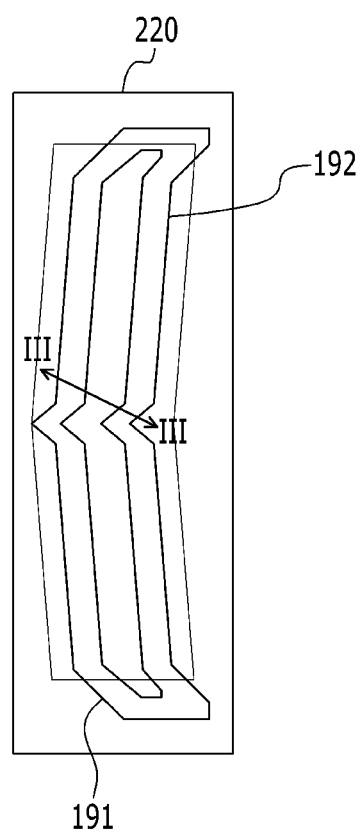
FIG. 3(a) shows a pixel electrode, a common electrode, and a black matrix of a comparative example of an LCD.
Figure 3B:
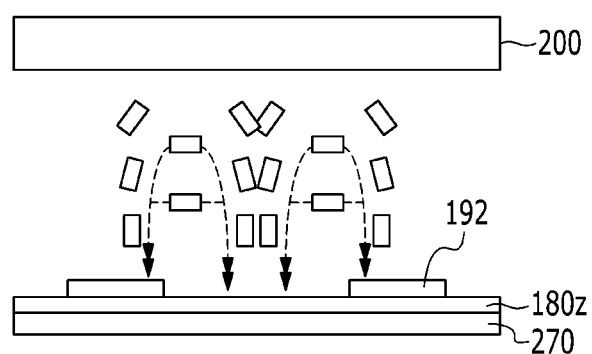
FIG. 3(b) shows a cross-sectional view of FIG. 3(a) taken along line III-III.
Figure 4A:
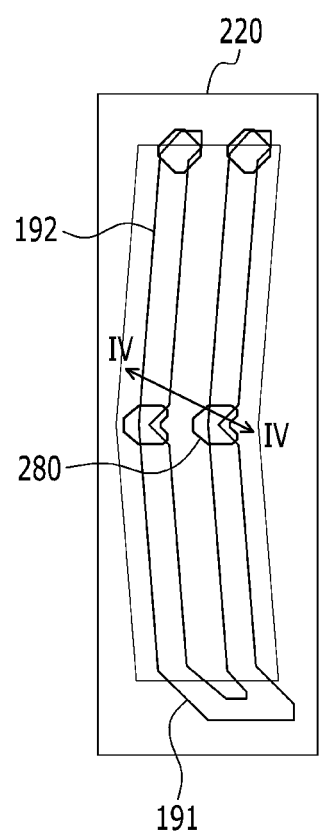
FIG. 4(a) shows a pixel electrode, a common electrode, and a black matrix of an exemplary embodiment of an LCD according to the invention.
Figure 4B:
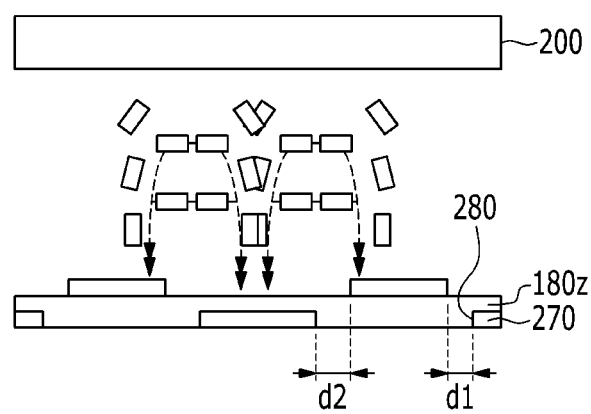
FIG. 4(b) shows a cross-sectional view of FIG. 4(a) taken along line IV-IV.

FIG. 3(a) shows a pixel electrode, a common electrode 270, and a black matrix of an LCD according to a comparative example of the invention, and FIG. 3(b) shows a cross-sectional view of FIG. 3(a) taken along line FIG. 4(a) shows a pixel electrode, a common electrode 270, and a black matrix of an LCD according to an exemplary embodiment of the invention, and FIG. 4(b) shows a cross-sectional view of FIG. 4(a) taken along line IV-IV.

Referring to FIGS. 3(a) and 3(b), a pixel branch electrode 192 is disposed on an upper portion of a common electrode 270 made as a whole plate. As shown in FIG. 3(b), a perpendicular electric field and a horizontal electric field are generated between the pixel branch electrode 192 and the common electrode 270. The liquid crystal molecules are aligned and transmit light therethrough to display an image by the perpendicular electric field and the horizontal electric field. In this instance, the horizontal electric field generated by applying a voltage between the pixel branch electrode 192 and the whole-plate common electrode 270 is only generated on the edge of the pixel branch electrode 192.

Therefore, the liquid crystal molecules are moved by the weak horizontal electric field, and when a force is applied from the outside, a horizontal movement state of the liquid crystal is easily changed. The horizontal moving state of the liquid crystal is easily changeable at the boundary where a direction of the liquid crystal is changed, that is, the middle region in which the pixel electrode is refracted or respective end regions. When the horizontal moving state of the liquid crystal is changed by an external force and is not restored to the original state, liquid crystal molecules are oriented in a different direction from the originally desired liquid crystal direction. The above-noted liquid crystal molecules are viewable as spots or induce luminance deterioration.

Therefore, regarding the LCD according to the comparative example of the invention, a notch is defined in order to control a change of the horizontal moving state of liquid crystal in the middle region or respective end regions of the pixel electrode. The notch represents a V-shaped region with an increasing refraction angle compared to other regions, and the notch is defined in the pixel electrode in the middle region and at the end region of the pixel electrode, thereby increasing intensity of the horizontal electric field. However, transmittance is deteriorated by texture caused by the notch, and intensity of the horizontal electric field is not strong enough to reorient the liquid crystal.

Hence, the LCD according to the embodiment of the invention solves the transmittance reduction problem caused by the notch as well as increases the intensity of the horizontal electric field by defining the opening in the common electrode 270 instead of removing the notch on the pixel electrode.

FIG. 4(a) shows a pixel electrode, a common electrode 270, and a black matrix of an LCD according to an exemplary embodiment of the invention, and FIG. 4(b) shows a cross-sectional view of FIG. 4(a) taken along line IV-IV.

Referring to FIG. 4(a), the LCD according to an exemplary embodiment of the invention defines the opening 280 in the corresponding common electrode 270 instead of defining a notch in the middle region and the end regions of the pixel electrode. FIG. 4(b) shows a cross-section of FIG. 4(a) taken along line IV-IV. Referring to FIG. 4(b), a common electrode 270 is not provided at a lower portion of the pixel branch electrode 192. The common electrode 270 defines an opening in a region that corresponds to the middle region of the pixel branch electrode 192, and it is separated from edges of the pixel branch electrode 192 with distances d1 and d2.

As described above, the opening has a similar shape to the notch, so in the embodiment of the invention, the same or an improved effect as with defining the notch is acquirable without defining the notch. Referring to FIG. 4(b), since the pixel branch electrode 192 does not overlap the common electrode 270 because of formation of the opening of the common electrode 270, it is found that the horizontal electric field between the pixel branch electrode 192 and the common electrode 270 is increased. Since the pixel branch electrode 192 is separated from the common electrode 270 with a predetermined distance therebetween, the region occupied by the horizontal electric field from among the entire region is increased and the horizontal electric field is increased. As described, the LCD according to an exemplary embodiment of the invention defines the opening in the common electrode 270 to increase the intensity of the horizontal electric field and control disclination of the liquid crystal, and eliminates the notch that is required in the prior art to improve transmittance.

Figure 5:
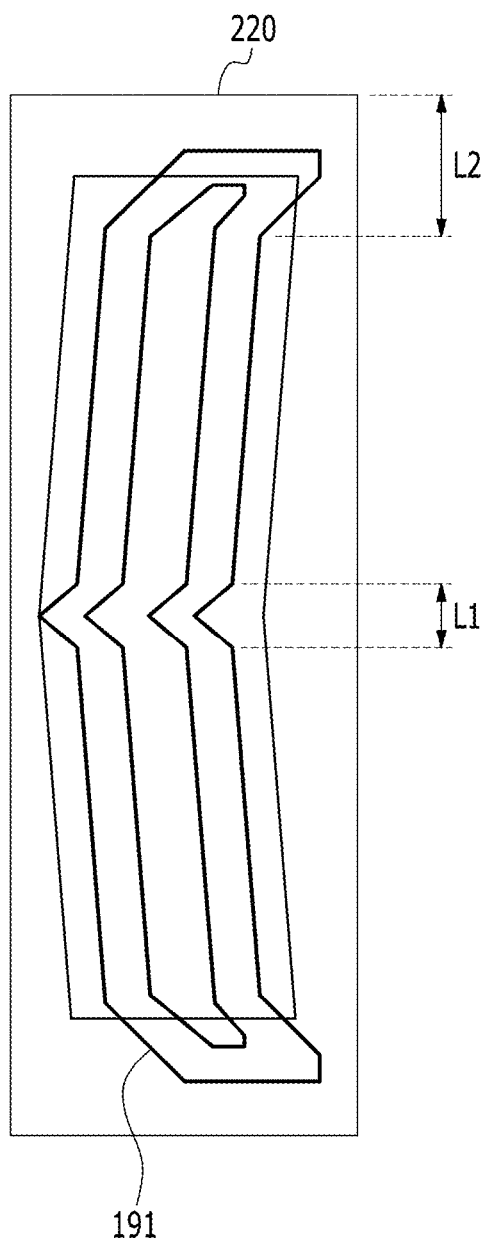
FIG. 5 shows a pixel electrode of a comparative example of an LCD according to the invention.
Figure 6:
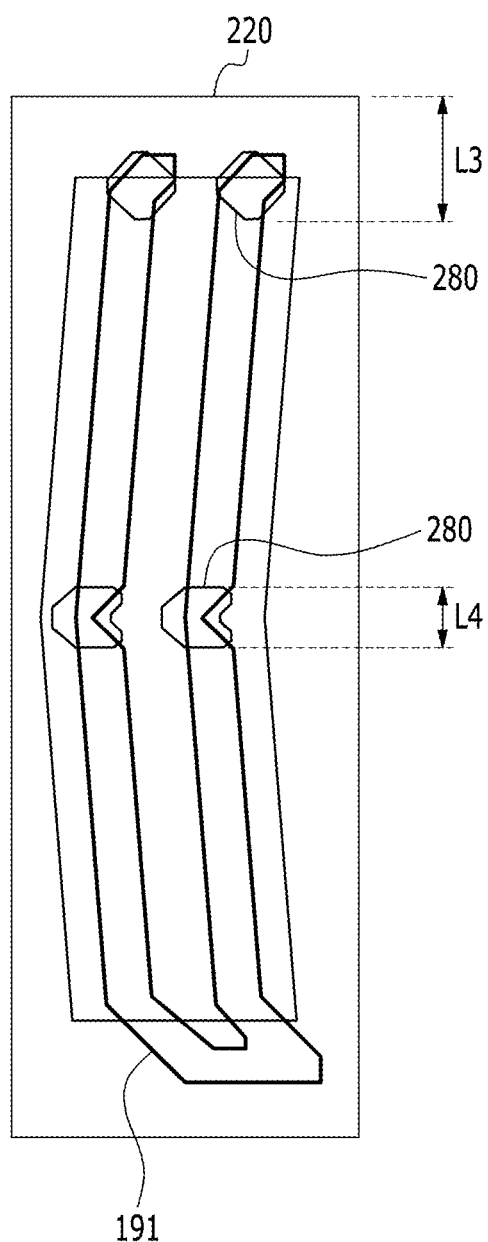
FIG. 6 shows a pixel electrode of an exemplary embodiment of an LCD according to the invention.
Figure 15:
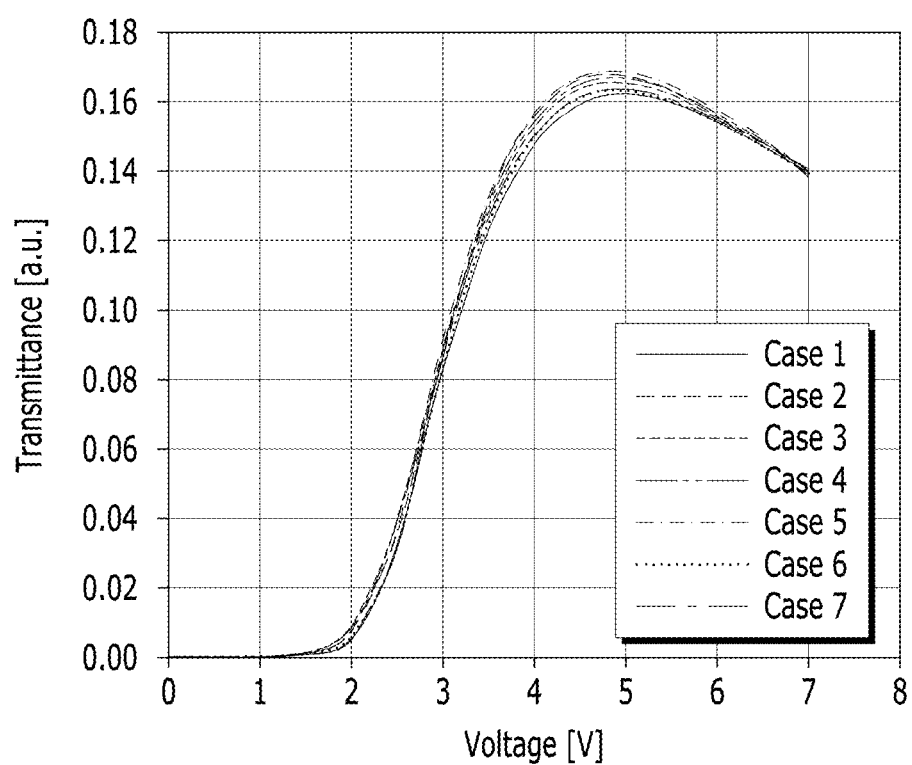
FIG. 15 shows a graph of experimental results of transmittance of a comparative example and an exemplary embodiment of an LCD according to the invention.

An improved transmittance effect caused by removal of the notch of the LCD according to an exemplary embodiment of the invention will now be described with reference to FIGS. 5, 6, 15 and 16. FIG. 5 shows a pixel electrode of an LCD according to a comparative example of the invention. FIG. 6 shows a pixel electrode of an LCD according to an exemplary embodiment of the invention. FIG. 15 shows a graph of an experimental result of a transmittance measured in terms of absorbance units (a.u.) corresponding to a voltage measured in terms of volts (V) of an LCD according to a comparative example and an exemplary embodiment of the invention. FIG. 16 shows a photograph of a transmittance experimental result according to a comparative example and an exemplary embodiment.

Referring to FIG. 5, the regions in which the image is invisible are shown as L1 and L2. Differing from the region intercepted by the black matrix 220, there are regions L1 and L2 in which the image is not visible by alignment of liquid crystal molecules on the pixel electrode. The regions L1 and L2 are boundary regions where the alignment direction of the liquid crystal molecules is changed, and they are shown as dark since the alignment direction of the liquid crystal molecule is different from at the visible region.

Referring to FIG. 6, the regions L3 and L4 in which the image is not visible are shown. When the region L1 of FIG. 5 is compared with the region L4 of FIG. 6 provided in the same region, it is difficult to reduce the length of the region L1 to be less than a predetermined value because of a length of the notch, but it is possible to reduce the length of the region L4 by reducing the region of the opening 280.

Further, the region L2 of FIG. 5 is a region that is shown as dark because of connection of the upper portion notch and the pixel branch electrode 192. Since an upper portion of the pixel electrode of FIG. 5 must be bent with a sufficient angle in order to increase the horizontal electric field applied to the liquid crystal molecule, the length of the region L2 is increased.

However, referring to FIG. 6, the LCD according to an exemplary embodiment of the invention defines the opening in the common electrode that corresponds to the upper portion of the pixel branch electrode 192. Therefore, since the pixel branch electrode 192 does not need to be bent to be long, the length of the region L3 of FIG. 6 is shorter than the length of the region L2 of FIG. 5.

Therefore, the LCD defines the opening in the common electrode that corresponds to a notch formation position instead of defining the notch on the pixel electrode thereby improving transmittance compared to the LCD according to the comparative example.

Figure 16A:
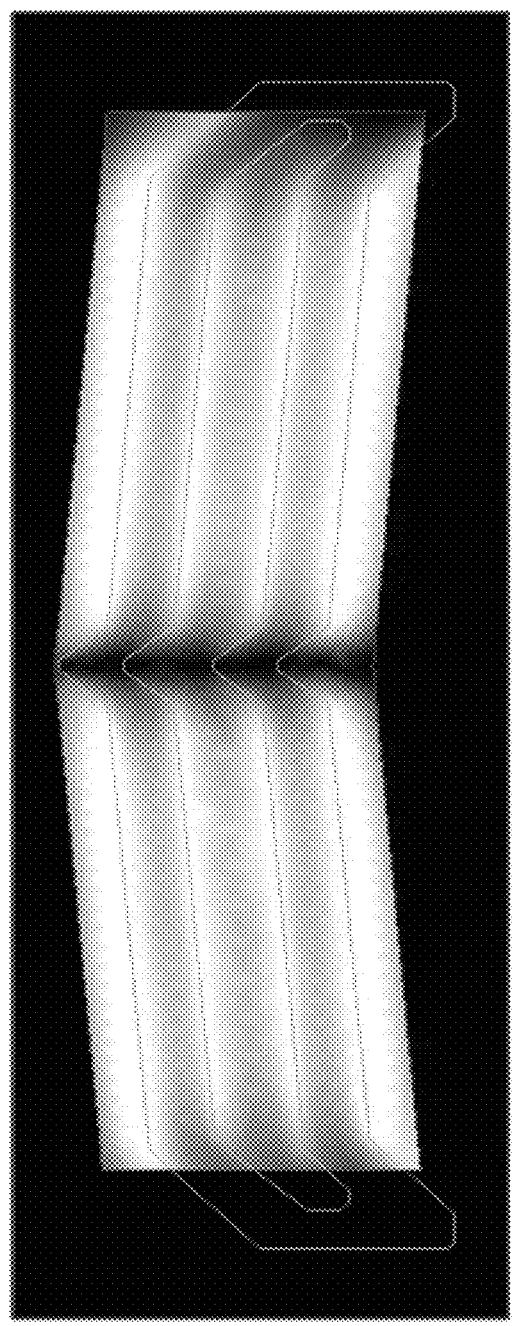
FIGS. 16A to 16E show photographs of a transmission degree of experimental results of transmittance of a comparative example and an exemplary embodiment of an LCD according to the invention.
Figure 16B:
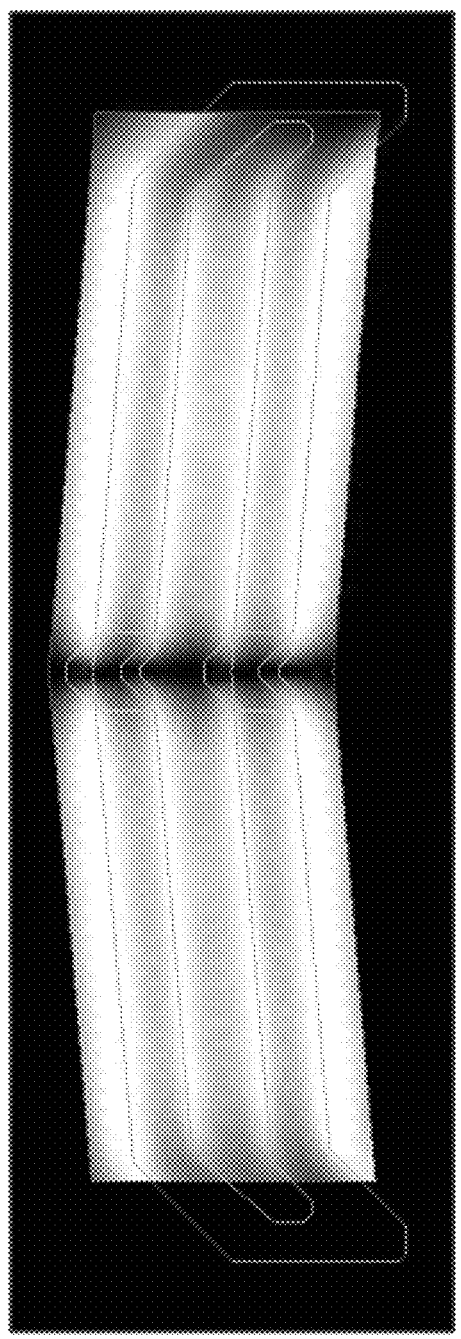
Figure 16C:
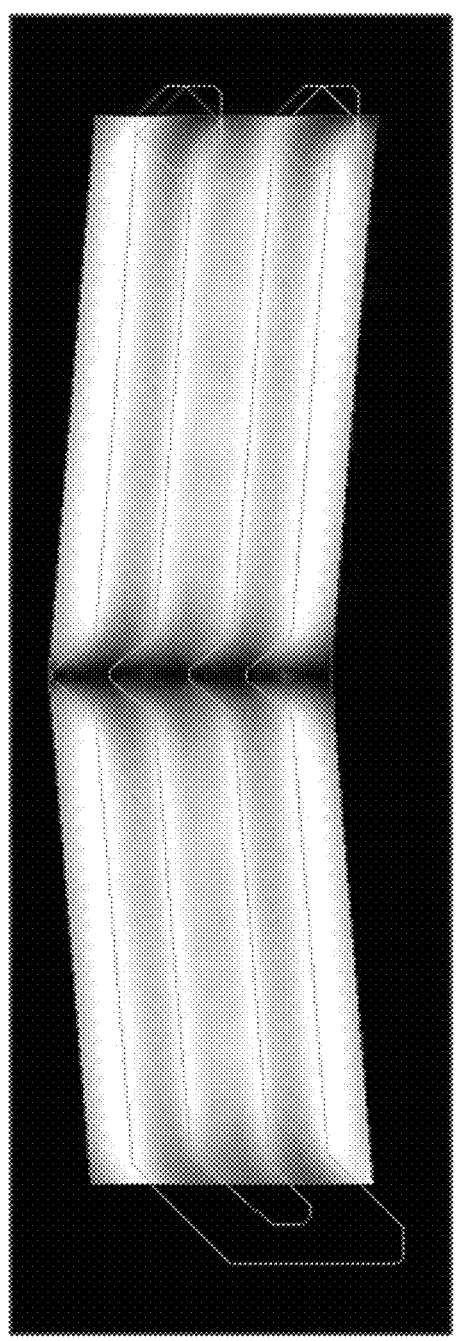
Figure 16D:
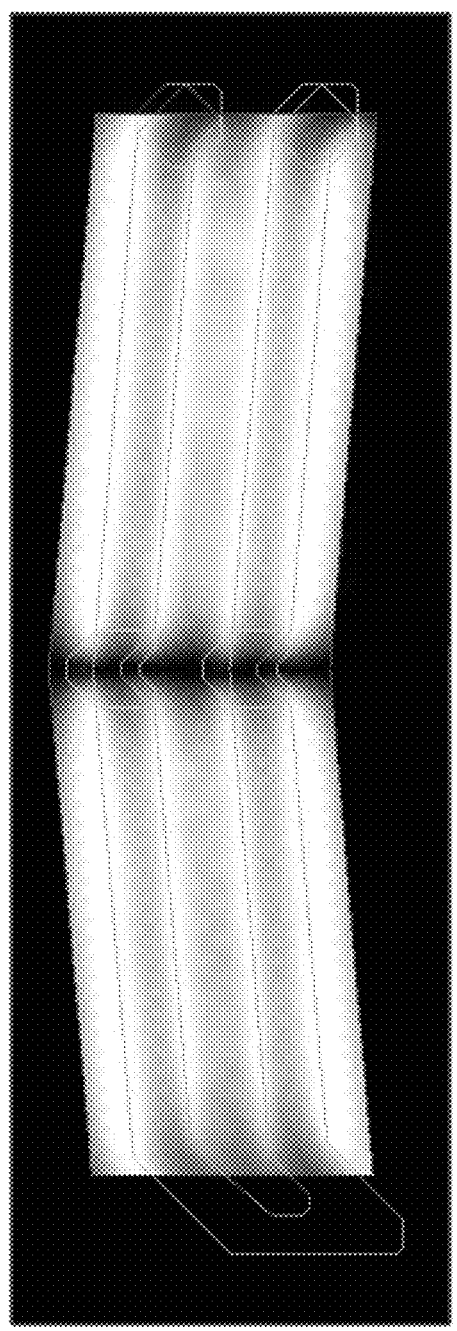
Figure 16E:
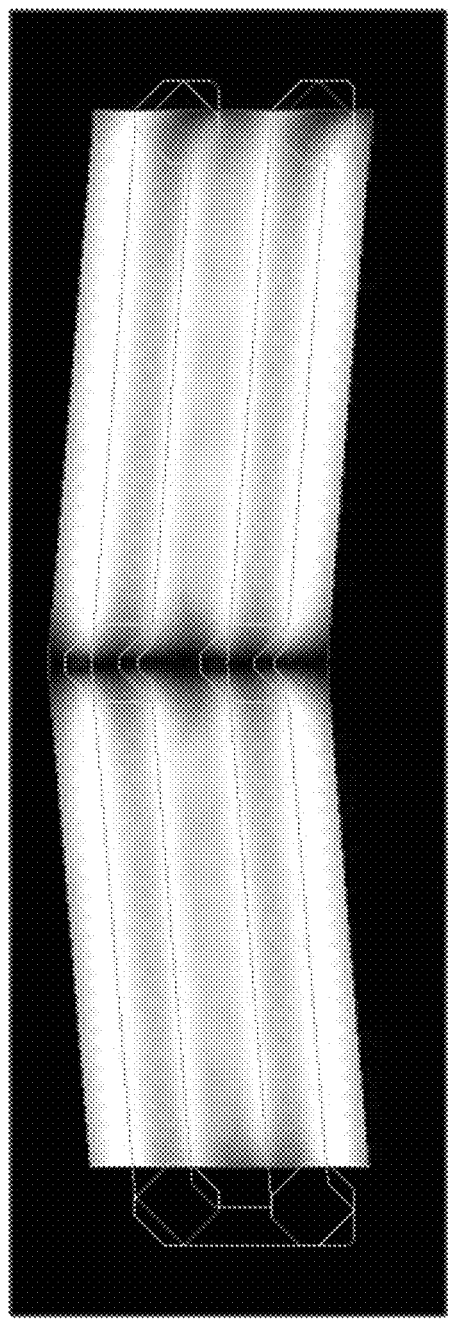

The improved transmittance effect will now be described with reference to FIGS. 15 to 16E. In order to determine the improved transmittance effect, tests on the LCD having an electrode configuration according to a comparative example and an exemplary embodiment of the invention are performed. The electrode configuration used for the tests is given in Table 1.

TABLE 1

| Identity numbers | Pixel electrode first curved portion angle (°) | Common electrode opening position |
|---|---|---|
| 1 Comparative Example 1 | 5 | None |
| 2 Exemplary Embodiment 1 | 5 | Center portion |
| 3 Exemplary Embodiment 2 | 5 | Upper portion |
| 4 Exemplary Embodiment 3 | 5 | Center + upper portion |
| 5 Comparative Example 2 | 3 | Center + upper portion |
| 6 Exemplary Embodiment 4 | 3 | None |
| 7 Exemplary Embodiment 5 | 5 | Center + upper portion + lower portion |

Transmittance changes by applying a voltage to the electrode through TechWiz Sim® according to the comparative example and the exemplary embodiment are measured.

Measurement results are expressed in Table 2. Also, results of Table 2 are shown as a graph in FIG. 15.

TABLE 2

| Voltage (V) | ① Prior configuration (Slit 5°) | ② New (Center portion) (Slit 5°) | ③ New (Upper portion) (Slit 5°) | ④ New (Center + upper portion) (Slit 5°) | ⑤ New (Center + upper portion) (Slit 3°) | ⑥ Prior configuration (Slit 3°) | ⑦ New (Center + Upper and lower) (Slit 5°) |
|---|---|---|---|---|---|---|---|
| 0 | 7.04E−05 | 7.14E−05 | 7.11E−05 | 7.12E−05 | 7.10Ec−05 | 7.03E−05 | 7.10E−05 |
| 0.5 | 8.01E−05 | 8.02E−05 | 8.01E−05 | 7.88E−05 | 7.60E−05 | 7.76E−05 | 7.71E−05 |
| 1 | 0.00030647 | 0.00029617 | 0.00029482 | 0.00026354 | 0.00020128 | 0.00024984 | 0.00022579 |
| 1.5 | 0.0016618 | 0.0016105 | 0.0016409 | 0.0014649 | 0.0009863 | 0.001236 | 0.0012525 |
| 2 | 0.008189 | 0.0081316 | 0.0084667 | 0.0079255 | 0.0051881 | 0.005859 | 0.0072825 |
| 2.5 | 0.035493 | 0.036685 | 0.038041 | 0.037481 | 0.031225 | 0.030826 | 0.037048 |
| 3 | 0.082327 | 0.085671 | 0.088169 | 0.088309 | 0.087097 | 0.082015 | 0.089418 |
| 3.5 | 0.12199 | 0.12545 | 0.12849 | 0.12923 | 0.13089 | 0.12412 | 0.1313 |
| 4 | 0.14679 | 0.14933 | 0.15244 | 0.15346 | 0.15562 | 0.14925 | 0.15574 |
| 4.5 | 0.1588 | 0.16039 | 0.16322 | 0.16437 | 0.166 | 0.16062 | 0.16643 |
| 5 | 0.16194 | 0.16285 | 0.16516 | 0.1665 | 0.16728 | 0.16282 | 0.2 |
| 5.5 | 0.15959 | 0.15998 | 0.16173 | 0.16314 | 0.16311 | 0.15967 | 0.16424 |
| 6 | 0.15435 | 0.15416 | 0.15526 | 0.15665 | 0.15589 | 0.15395 | 0.15729 |
| 6.5 | 0.14768 | 0.14717 | 0.14757 | 0.14895 | 0.14729 | 0.14695 | 0.14935 |
| 7 | 0.14044 | 0.13986 | 0.13985 | 0.13996 | 0.13897 | 0.13938 | 0.13818 |
| Vp 3.5 V reference ratio (X/①) | 100.0 | 102.8 | 105.3 | 105.9 | 107.3 | 101.7 | 107.6 |

TABLE 2-continued

| Voltage (V) | ① Prior configuration (Slit 5°) | ② New (Center portion) (Slit 5°) | ③ New (Upper portion) (Slit 5°) | ④ New (Center + upper portion) (Slit 5°) | ⑤ New (Center + upper portion) (Slit 3°) | ⑥ Prior configuration (Slit 3°) | ⑦ New (Center + Upper and lower) (Slit 5°) |
|---|---|---|---|---|---|---|---|
| Max value reference ratio (X/①) | 100.0 | 100.6 | 102.0 | 102.8 | 103.3 | 100.5 | 103.8 |

As expressed in Table 2, it is found that the transmittance of Exemplary Embodiments 1 to 3 and Exemplary Embodiment 5 of the invention defining the opening compared to Comparative Example 1 having the same angle of the first refraction unit.

Further, in the case of the angle of the first refraction unit as 3, it is found that transmittance of the fourth exemplary embodiment of the invention is substantially improved compared to the second comparative example.

In addition, the improved transmittance effect in the case of defining the opening according to the embodiment of the invention is found to be better than the method for reducing the angle of the first refraction unit of the pixel electrode. In detail, when Comparative Example 1 and Comparative Example 2 of the invention with the angles of the first refraction unit angle as about 5° and about 3° are compared, the effect by reduction of the angle of the refraction unit is shown to be 1.7 percent (%).

However, the effect for the case in which the new electrode configuration is provided as described in an exemplary embodiment of the invention is found to be greater than the above-described case. That is, when Comparative Example 1 having no opening and the third exemplary embodiment and the fifth exemplary embodiment of the invention defining the opening are compared, the improving transmittance effect of the third exemplary embodiment of the invention defining the opening in the center and upper portions is shown to be 5.9%. Further, the transmittance improved effect according to the fifth exemplary embodiment of the invention having the center and upper and lower portions provided in the opening is shown to be 7.6%. Therefore, it is found that the improved transmittance effect induced by an opening is better than reduction of a refraction angle of the electrode.

Further, the transmittance improved effect is determined in a visual manner. FIGS. 16A to 16E show photographs of transmittance of respective tests. FIG. 16A shows transmission for Comparative Example 1, FIG. 16B shows transmission for the first exemplary embodiment, FIG. 16C shows transmission for the second exemplary embodiment, FIG. 16D shows transmission for the third exemplary embodiment, and FIG. 16E shows transmission for the fifth exemplary embodiment.

Referring to FIG. 16, the electrodes shown in FIGS. 16B to 16E are determined to be brighter than that of FIG. 16A that is Comparative Example 1. Particularly, FIG. 16E that corresponds to the fifth exemplary embodiment defining the opening in the center portion and the upper and lower portions of the electrode shows the brightest luminance, which corresponds to the above-noted voltage-transmittance test results.

An LCD according to another exemplary embodiment of the invention will now be described with reference to FIGS. 7 to 9.

Figure 7:
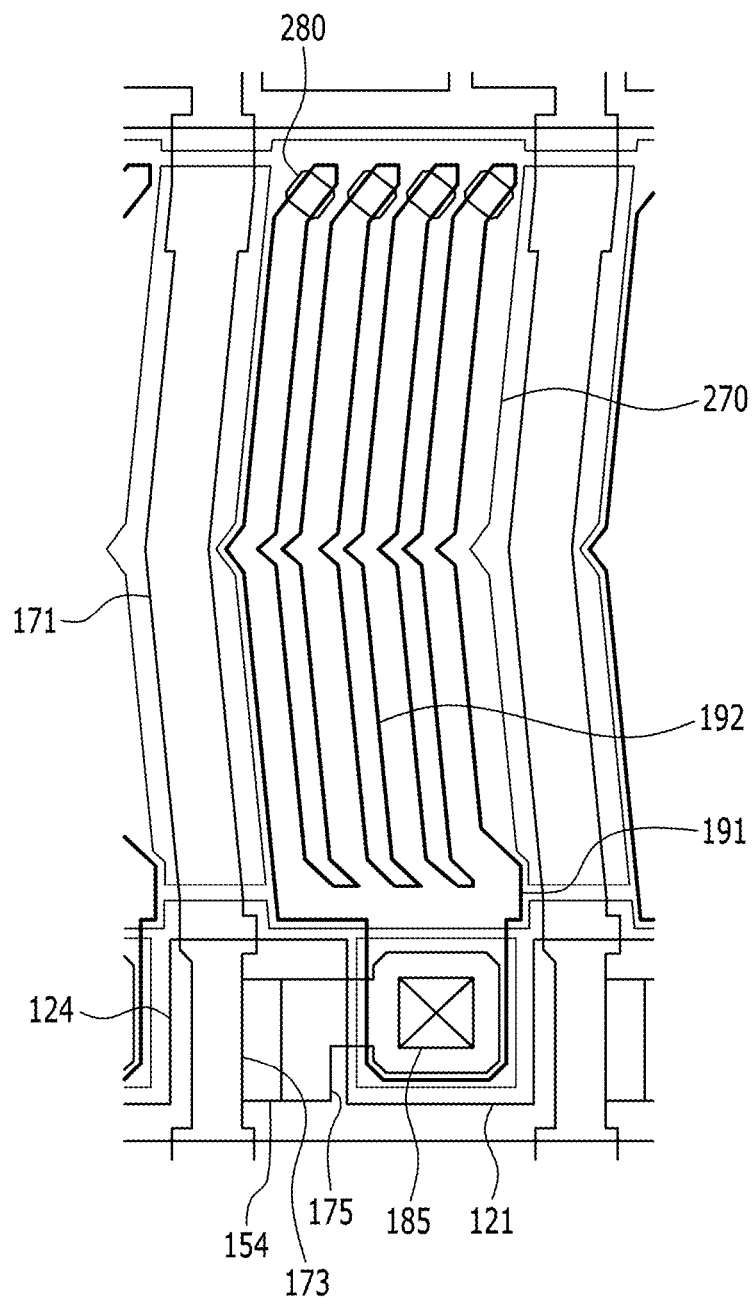
FIGS. 7 to 9 show another exemplary embodiment of an LCD according to the invention.
Figure 8:
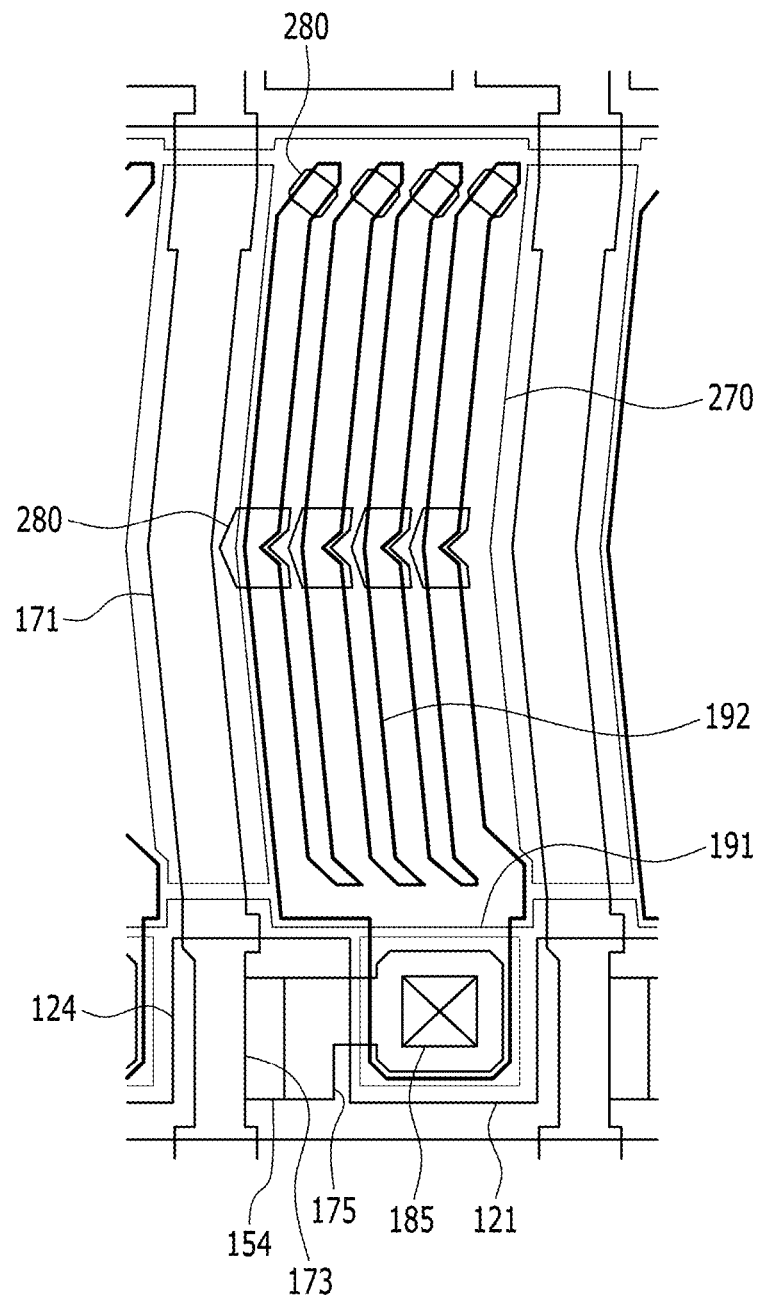
Figure 9:
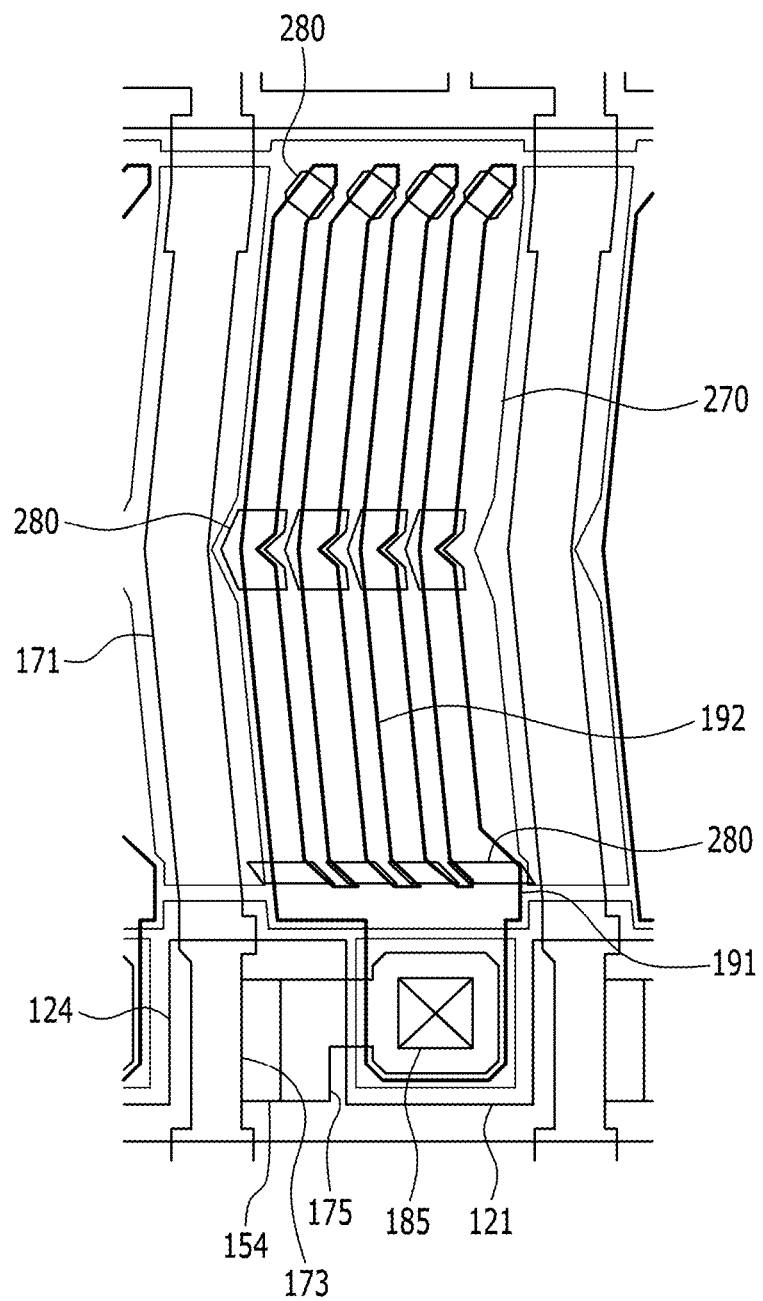

FIGS. 7 to 9 show an LCD according to another exemplary embodiment of the invention.

FIG. 7 shows an LCD in which a common electrode opening 280 is defined in an end portion of a pixel electrode 191. The LCD shown in FIG. 7 is similar to the LCD shown in FIG. 1. Similar constituent elements will not be described.

The LCD according to an exemplary embodiment shown in FIG. 7 defines the opening 280 of the common electrode 270 at the end portion of the pixel branch electrode 192.

The pixel branch electrodes 192 shown in FIG. 7 are not connected to each other at the end portion of the pixel electrode 191 that is not connected to the drain electrode 175, but are separated from each other. That is, the pixel electrode 191 generally has a shape of a fork, for example. The pixel electrode 191 includes a first curved portion that corresponds to the data line 171, and a second curved portion having a greater angle than the first curved portion is provided in the middle region of the pixel electrode.

Differing from the LCD according to the exemplary embodiment shown in FIG. 1, the second curved portion is provided on respective sides of the middle region of the pixel branch electrode 192 in the pixel electrode according to the current exemplary embodiment. That is, the pixel branch electrode 192 includes a notch defined at the center thereof. This is because the opening of the common electrode 270 is defined at the end portion rather than the middle region of the pixel electrode 191 in the LCD according to the current exemplary embodiment. The description regarding the angle of the first curved portion and the second curved portion are the same as those that are described with reference to FIG. 1.

The end portion of the pixel branch electrode 192 is bent at a predetermined angle. The bent angle may be greater than an angle of the first curved portion, and may be similar to an angle of the second curved portion. The bent angle at the end portion may be greater than the angle of the second curved portion depending on the case.

An opening 280 is defined in the common electrode 270 at the end portion from which the pixel electrode 191 is separated. That is, the pixel electrode 191 does not overlap the common electrode 270 at the end portion of the pixel electrode 191 because of the opening 280.

The number of openings 280 is that same as that of pixel branch electrodes 192.

The opening 280 is defined at the end portion of the pixel branch electrode 192. In an exemplary embodiment, the opening 280 has a quadrangular shape, and the horizontal width of the opening 280 is greater than the width of the pixel branch electrode 192. The opening 280 is provided in parallel with the direction in which the end portion of the pixel branch electrode 192 is bent, and one side edge of the pixel branch electrode 192 is separated from the edge of the opening with a predetermined distance therebetween. Due to the opening and the separated distance between the opening 280 and the pixel electrode 191, the horizontal electric field at the end portion of the pixel electrode is increased, and the change of the horizontal moving state of the liquid crystal by an external force is controlled.

The disclination of the liquid crystal is generally generated at the end portion or the middle region of the pixel electrode, it changes adjacent liquid crystal molecules in the same direction, and it proceeds to the center of the pixel electrode. Therefore, deterioration of luminance of the entire pixel electrodes caused by disclination of liquid crystal may be prevented by increasing the intensity of the horizontal electric field at respective end portions and the middle region of the pixel electrode.

An LCD according to another exemplary embodiment of the invention will now be described with reference to FIG. 8. FIG. 8 shows an LCD when a common electrode opening 280 is defined in the middle region and at one end portion of pixel electrode 191. The LCD shown in FIG. 8 is similar to the LCD shown in FIG. 1. Similar constituent elements will not be described.

Regarding the LCD according to an exemplary embodiment shown in FIG. 8, the opening 280 of the common electrode 270 is defined in the middle region and at the end portion of the pixel branch electrode 192.

The pixel branch electrode 192 may further include a second curved portion that is bent to have a predetermined angle with respect to the first curved portion in the middle region. The second curved portion is bent to define a predetermined angle with the first curved portion, and the second curved portion may be further bent to substantially have an angle of about 7° to about 15° from the first curved portion.

The second curved portion is provided on one side of the pixel branch electrode 192. That is, regarding one pixel branch electrode 192, the second curved portion is provided on one side but the second curved portion is not provided to the other side. The second curved portion is provided inside the pixel branch electrode 192 so the width of the pixel branch electrode 192 in the middle region is reduced by the second curved portion.

The pixel branch electrodes 192 are not connected to each other at the end portion of the pixel electrode 191 that is not connected to the drain electrode 175, but are separated from each other. That is, the pixel electrode 191 generally has the shape of a fork, for example. The end portion of the pixel branch electrode 192 is bent at a predetermined angle. The bent angle is greater than the angle of the first curved portion, and may be similar to the angle of the second curved portion. The bent angle of the end portion may be greater than the angle of the second curved portion depending on the case.

An opening 280 is defined in the common electrode 270 that corresponds to the middle region of the pixel branch electrode 192. The opening 280 defined in the middle region includes a V-shaped first lateral side with a predetermined angle, a V-shaped second lateral side that is smaller than the first lateral side, and an upper side and a lower side for connecting the first lateral side and the second lateral side on a straight line. The angle of the first lateral side is the same as or similar to the angle of the second lateral side. The description regarding the opening corresponds to the previous description.

An opening 280 is defined in the end portion of the pixel branch electrode. The opening 280 has a quadrangular shape, and the horizontal width of the opening 280 is greater than the width of the pixel branch electrode 192. The opening 280 is provided in parallel with the direction in which the pixel branch electrode 192 is bent, and one side edge of the pixel branch electrode 192 is separated from the edge of the opening with a predetermined distance therebetween.

An LCD device according to another exemplary embodiment of the invention will now be described with reference to FIG. 9. FIG. 9 shows an LCD in which a common electrode opening 280 is defined in the middle region and at both end portions of pixel electrode 191. The LCD shown in FIG. 9 is similar to the LCD shown in FIG. 8. Similar constituent elements will not be described.

Regarding the LCD according to an exemplary embodiment shown in FIG. 9, the opening 280 of the common electrode 270 is defined in the middle region and at respective end portions of the pixel branch electrode 192. That is, the LCD according to the exemplary embodiment shown in FIG. 9 additionally defines an opening 280 of the common electrode 270 at the end portion on the side where the pixel electrode contacts a drain compared to the exemplary embodiment of FIG. 8.

The opening 280 defined at the end portion of the pixel electrode corresponds to the region in which the pixel electrode is bent with the angle that is greater than the first curved portion. The opening includes respective lateral sides having the same angle as the bent angle of the pixel electrode and upper and lower sides for connecting the lateral sides. In an exemplary embodiment, the opening may have a quadrangular shape or a parallelogram shape, for example. The horizontal width of the opening 280 is larger than the width of the pixel branch electrode 192. Therefore, an edge of one lateral side of the pixel branch electrode 192 is separated from an edge of one side of the opening by a predetermined distance.

The description regarding the opening defined in the middle region of the pixel electrode and the opening defined at the opposite end portion correspond to the description that is provided in the exemplary embodiment of FIGS. 7 and 8.

Figure 10:
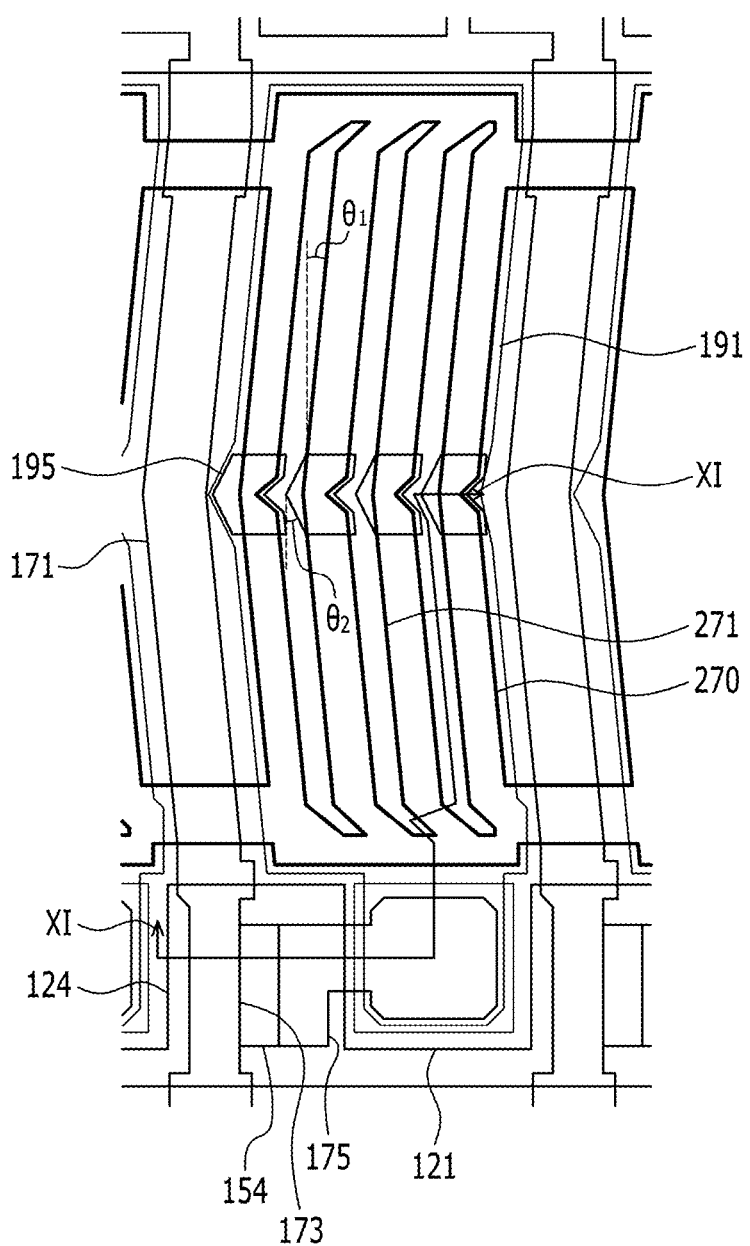
FIG. 10 shows a plan view of another exemplary embodiment of an LCD according to the invention.
Figure 11:
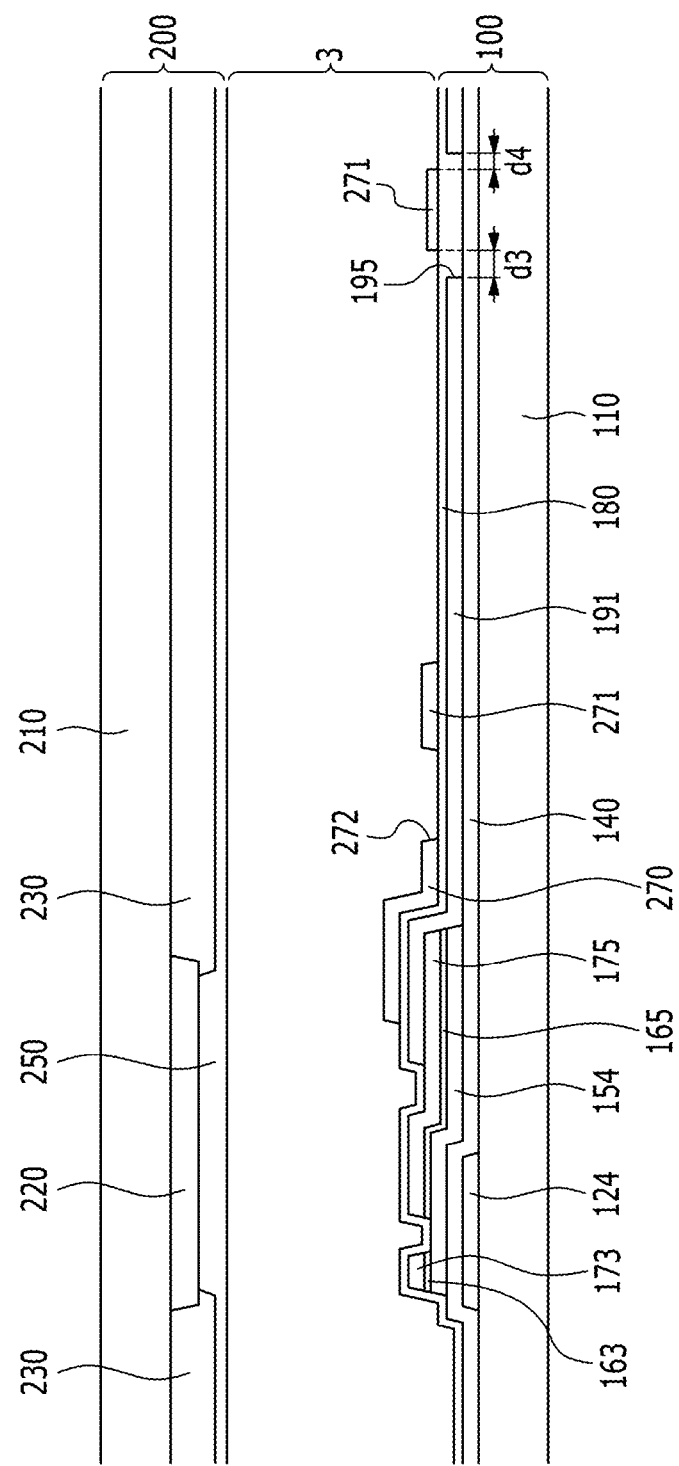
FIG. 11 shows a cross-sectional view of another exemplary embodiment of an LCD according to the invention taken along line XI-XI of FIG. 10.

An LCD according to another exemplary embodiment of the invention will now be described with reference to FIGS. 10 and 11. FIG. 10 shows a plan view of an LCD according to another exemplary embodiment of the invention. FIG. 11 shows a cross-sectional view of an LCD according to another exemplary embodiment of the invention taken along line XI-XI of FIG. 10. Referring to FIGS. 10 and 11, the LCD according to the current exemplary embodiment is similar to the LCD according to the exemplary embodiment shown in FIGS. 1 and 2.

Referring to FIGS. 10 and 11, the LCD according to an exemplary embodiment of the invention includes a lower panel 100 and an upper panel 200 facing each other, and a liquid crystal layer 3 therebetween.

The lower panel 100 will now be described.

A gate conductor including a gate line 121 is disposed on an insulation substrate 110.

In an exemplary embodiment, a gate insulating layer 140 including a silicon nitride (SiNx) or a silicon oxide (SiOx) is disposed on the gate conductor.

A semiconductor 154 is disposed on the gate insulating layer 140.

Ohmic contacts 163 and 165 are disposed on the semiconductor 154. In an exemplary embodiment, when the semiconductor 154 is an oxide semiconductor, the ohmic contacts 163 and 165 may be omitted.

A data line 171 including a source electrode 173 and a data conductor including a drain electrode 175 are disposed on the ohmic contacts 163 and 165 and the gate insulating layer 140.

A pixel electrode 191 is disposed on the drain electrode 175. In an exemplary embodiment, the pixel electrode 191 is planar, that is, has a plate shape, and is disposed in a pixel area. An opening 195 disposed is defined in the center region of the pixel electrode in a plan view. That is, the common electrode 270 does not overlap the pixel electrode in the center region of the pixel electrode because of the opening 195. A detailed description of the opening 195 will be described later.

A passivation layer 180 is disposed on the data conductors 171, 173, and 175, the gate insulating layer 140, the exposed portion of the semiconductor 154, and the pixel electrode 191. However, regarding the LCD according to another exemplary embodiment of the invention, the passivation layer 180 may be disposed between the pixel electrode 191 and the data line 171, and the pixel electrode 191 may be connected to the drain electrode 175 through a contact hole (not shown) provided in the passivation layer 180.

A common electrode 270 is disposed on the passivation layer 180. Common electrodes 270 are connected to each other and receive a common voltage from a common voltage applier disposed outside the display area.

The common electrode 270 includes a curved edge that is substantially parallel to the first curved portion of the data line 171, and common electrodes 270 disposed on adjacent pixels are connected to each other. A plurality of cutouts 272 is defined in the common electrode 270, and the common electrode 270 includes a plurality of common branch electrodes 271 defined by the cutouts 272.

Referring to FIG. 10, the common electrode 270 includes a curved portion substantially parallel to the first curved portion of the data line, and the curved portion of the common electrode 270 may meet the same in the middle region to have a V shape. The angle of the curved portion of the common electrode 270 is similar to the first curved portion of the data line. That is, in an exemplary embodiment, the angle of the curved portion of the common electrode 270 may be about 3° to about 7°. Referring to FIG. 10, the angle of the common electrode 270 curved portion is shown as $\theta_1$. The angle $\theta_1$ may be about 3° to about 7°, and more desirably, about 3° to about 5°.

The common branch electrode 271 may further include a second curved portion that is bent to define a predetermined angle with the first curved portion in the middle region. The second curved portion may be bent to have a predetermined angle with the first curved portion, and the second curved portion may be bent at about 7° to about 15° from the first curved portion.

The second curved portion is provided on one side of the common branch electrode 271. That is, regarding one common branch electrode 271, a second curved portion is provided to one side and the second curved portion is not provided to the other side. Since the second curved portion is provided inside the common branch electrode 271, the width of the common branch electrode 271 of the middle region is reduced by the second curved portion.

An opening 195 is defined in the pixel electrode 191 that corresponds to the middle region of the common electrode 270, that is, the region in which the second curved portion is provided. Therefore, the pixel electrode 191 does not overlap the common electrode 270 in the middle region of the common electrode 270 because of the opening 195.

The number of openings 195 is the same as that of the common branch electrodes 271. The opening 195 has a similar shape of the common electrode 270 that is provided in the middle region. The width of the opening 195 is greater than the width of the common branch electrode 271.

In detail, the opening 195 includes a V-shaped first lateral side with a predetermined angle, a V-shaped second lateral side that is smaller than the first lateral side, and an upper side and a lower side for connecting the first lateral side and the second lateral side on a straight line. The angle of the first lateral side is the same as or similar to the angle of the second lateral side. In detail, a difference between the angle of the V-shaped first lateral side and the angle of the V-shaped second lateral side V may be less than about 2°. However, depending on the case, the angle of the second lateral side may be greater than the angle of the first lateral side. The angle of the second lateral side may be greater than the angle of the first lateral side by about 2° to about 10°. In the exemplary embodiment, the opening 195 has the same angle as the V-shaped first lateral side and the V-shaped second lateral side.

The angle $\theta_2$ of the first lateral side and the second lateral side of the opening 195 is similar to the angle of the second curved portion of the common branch electrode 271. Therefore, regarding the second lateral side of the opening 195 that corresponds to one lateral side on which the second curved portion of the common branch electrode 271 is provided, the distance to the common branch electrode 271 is relatively narrow and uniform, compared to the other side.

On the contrary, the first lateral side of the opening 195 is provided on one side on which the first curved portion of the common branch electrode 271 is provided, and the angle of the first lateral side of the opening 195 is greater than the angle of the first curved portion. Therefore, the distance from an edge of the first lateral side of the opening 195 to the common branch electrode 271 is greater than that of the opposite side.

Referring to FIG. 11, an opening 195 is defined in the pixel electrode 191 below the common branch electrode 271. Therefore, the common branch electrode 271 is separated from the pixel electrode 191 by distances D3 and D4.

The distance D3 of FIG. 11 is a distance between the edge of the first lateral side of the opening 195 and one side on which the first curved portion of the common branch electrode 271 is provided. The distance D4 is a distance between the edge of the second lateral side of the opening 195 and one side on which the second curved portion of the common branch electrode 271 is provided. As described above, D3 is longer than D4.

Although not shown, in an exemplary embodiment, an alignment layer is coated on the common electrode 270 and the passivation layer 180, the alignment layer may be a horizontal alignment layer, and may be rubbed in a predetermined direction. However, according to an LCD according to another exemplary embodiment of the invention, the alignment layer may include a photoreactive material and may be optically aligned.

The upper panel 200 will now be described.

A light blocking member 220 is disposed on an insulation substrate 210. A plurality of color filters 230 is disposed on the substrate 210. In an exemplary embodiment, the color filter 230 may be disposed on the lower panel 100, and in this case, the light blocking member 220 may also be disposed on the lower panel 100.

An overcoat 250 is disposed on the color filter 230 and the light blocking member 220. In another exemplary embodiment, the overcoat 250 may be omitted.

An alignment layer may be disposed on the overcoat 250. In an exemplary embodiment, the liquid crystal layer 3 includes a nematic liquid crystal material having positive dielectric anisotropy. The liquid crystal molecules of the liquid crystal layer 3 are arranged so that a direction of a long axis thereof is parallel to the display panels 100 and 200, and the liquid crystal layer has a structure in which the direction of the long axis thereof is twisted about 90° from a rubbing direction of the alignment layer of the lower panel 100 to the upper panel 200 in a spiral shape, for example.

The LCD has the opening 195 defined in the region of the pixel electrode 191 that corresponds to the refraction unit of the common electrode 270. The opening 195 increases a horizontal electric field between the common electrode 270 and the pixel electrode thereby controlling disclination of liquid crystal molecules of the LCD and preventing deterioration of luminance caused by disclination.

Figure 12:
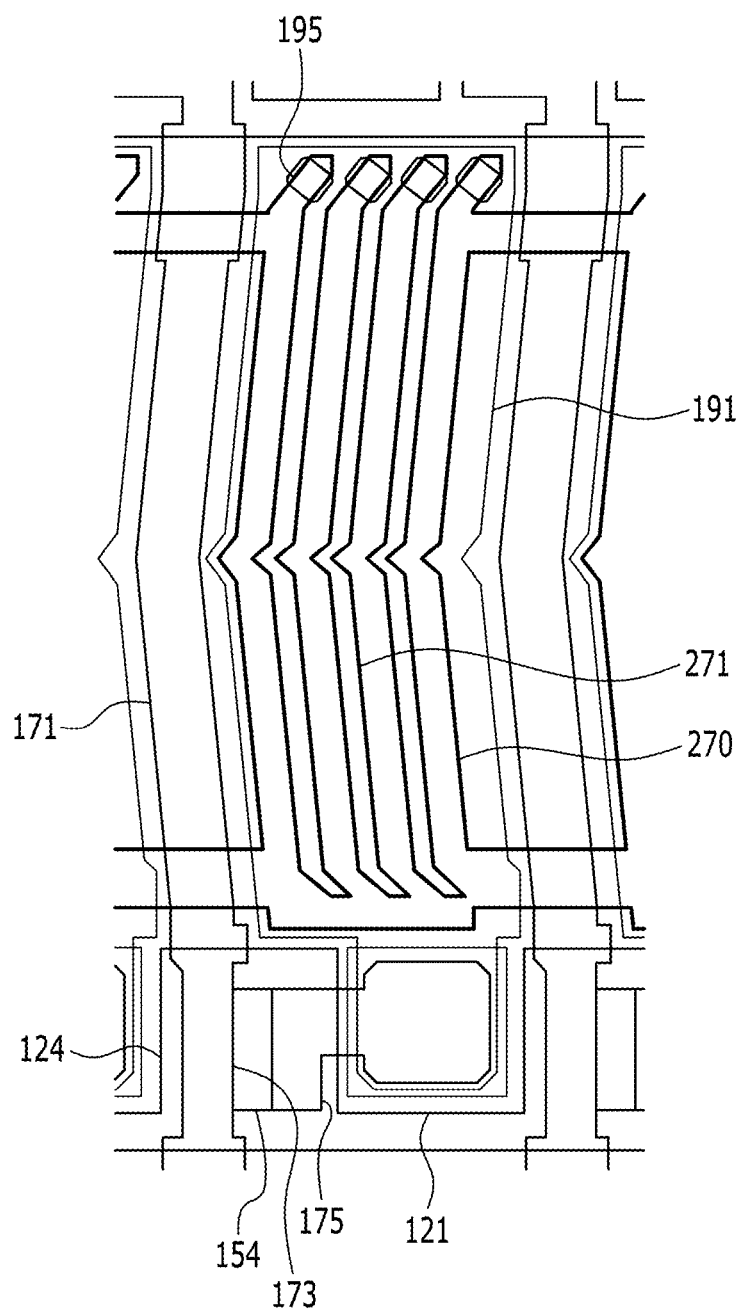
FIGS. 12 to 14 show LCD s having different positions and numbers of openings defined in a pixel electrode.
Figure 13:
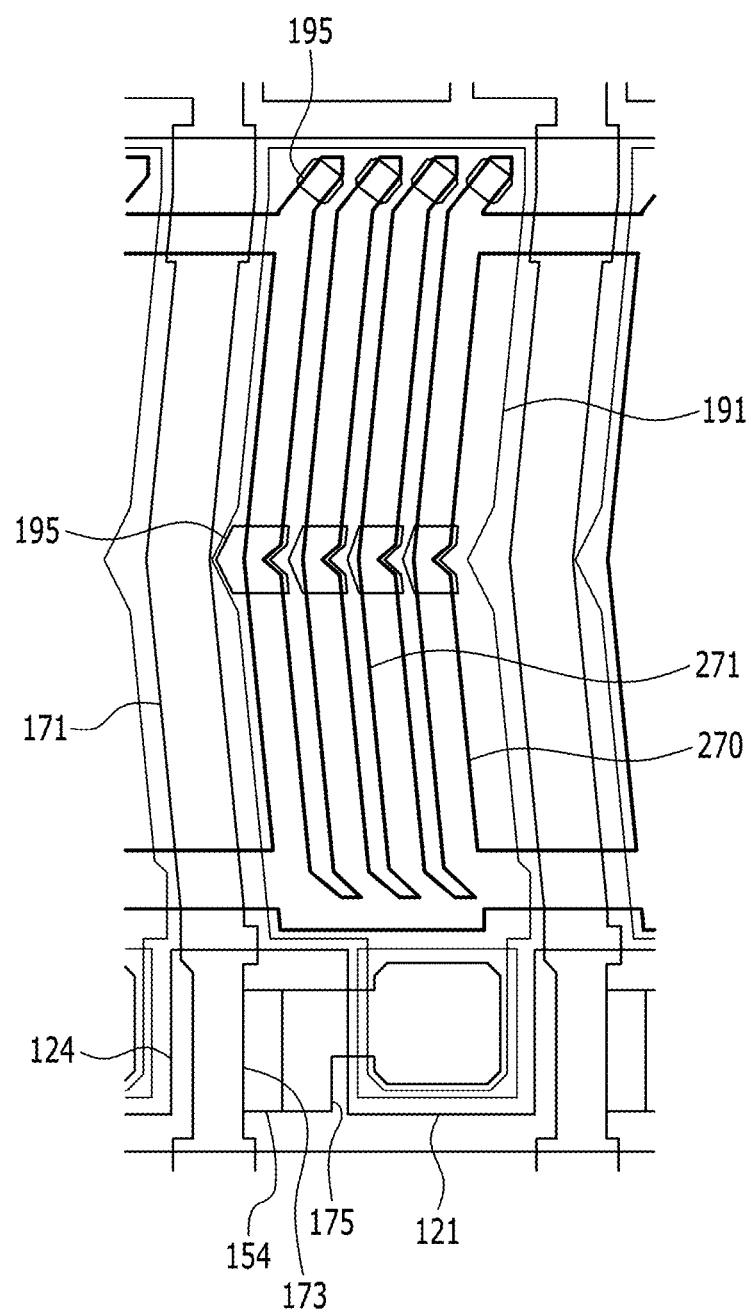
Figure 14:
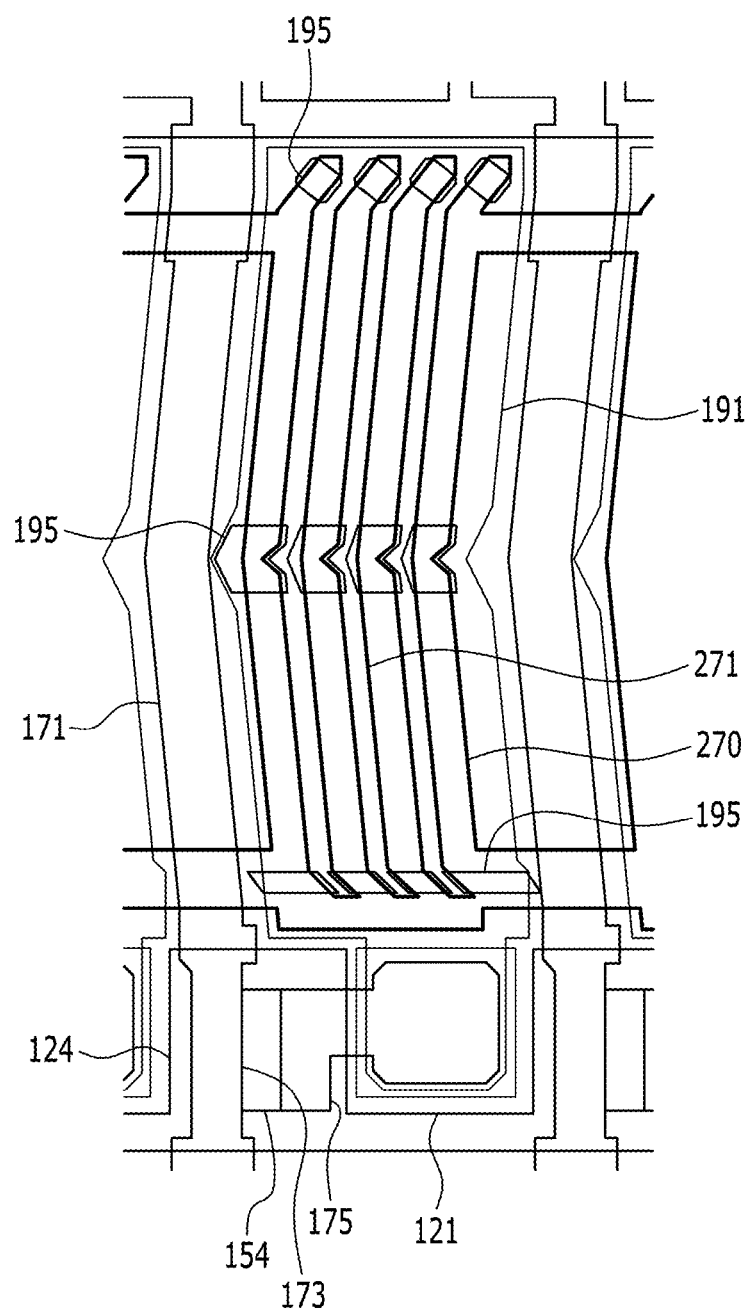

An LCD according to another exemplary embodiment of the invention will now be described with reference to FIGS. 12 to 14. FIGS. 12 to 14 show LCDs having different positions and numbers of openings defined in a pixel electrode.

FIG. 12 shows an LCD in which a pixel electrode opening 195 is defined at an end portion of the common electrode 270. The LCD shown in FIG. 12 is similar to the LCD shown in FIG. 10. Similar constituent elements will not be described.

The LCD according to an exemplary embodiment shown in FIG. 12 has the pixel electrode opening 195 at the end portion of the common branch electrode 271.

The end portions of the common branch electrodes 271 that are distanced from the drain electrodes are not connected to each other but are separated. That is, the common electrode 270 generally has a fork shape, for example. The common electrode 270 includes a first curved portion that corresponds to the data line 171, and a second curved portion having a greater angle than the first curved portion is provided in the middle region of the pixel electrode.

Differing from the LCD according to the exemplary embodiment shown in FIG. 10, the second curved portion is provided at respective sides of the middle region of the common branch electrode 271 of the common electrode 270 according to the current exemplary embodiment. That is, the common branch electrode 271 includes a notch defined in the middle region thereof. This is because the pixel electrode opening 195 is not defined in the middle region of the common electrode 270 but at the end portion of one side of the common branch electrode 271 in the LCD according to the current exemplary embodiment. The description regarding the angle of the first curved portion and the second curved portion correspond to those that are described with reference to FIG. 10.

The end portion of the common branch electrode 271 is bent at a predetermined angle. The bent angle may be greater than an angle of the first curved portion and may be similar to an angle of the second curved portion. The bent angle at the end portion may be greater than the angle of the second curved portion depending on the case.

An opening 195 is defined in the pixel electrode 191 at the end portion from which the common electrode 270 is separated. The number of openings 195 is same with that of the common branch electrodes 271.

The opening 195 is defined at the end portion of the common branch electrode 271. In an exemplary embodiment, the opening 195 has a quadrangular shape, for example, and the horizontal width of the opening 195 is greater than the width of the common branch electrode 271. The opening 195 is provided in parallel with the direction in which the common branch electrode 271 is bent, and an edge of one side of the common branch electrode 271 is separated from an edge of the opening 195 with a predetermined distance therebetween. Due to the opening 195 and the separated distance between the opening 195 and the common electrode 270, the horizontal electric field at the end portion of the common electrode 270 is increased, and the change of the horizontal moving state of liquid crystal by an external force is controlled.

FIG. 13 shows an LCD in which a pixel electrode opening 195 is defined in the middle region and at one end portion of the common electrode 270. The LCD shown in FIG. 13 is similar to the LCD shown in FIG. 10. Similar constituent elements will not be described.

However, regarding the LCD according to the exemplary embodiment shown in FIG. 13, the opening 195 of the pixel electrode is defined in the middle region and at the end portion of the common branch electrode 271.

The common branch electrode 271 may further include a second curved portion that is bent to define a predetermined angle with the first curved portion in the middle region. The second curved portion is bent to define a predetermined angle with the first curved portion, and the second curved portion may be further bent to define an angle of about 7° to about 15° with the first curved portion.

The second curved portion is provided on one side of the common branch electrode 271. That is, regarding one common branch electrode 271, the second curved portion is provided on one side but the second curved portion is not provided to the other side. The second curved portion is provided inside the common branch electrode 271 so the width of the common branch electrode 271 in the middle region is reduced by the second curved portion.

The end portion of the common branch electrode 271 that is provided at the far side from the drain electrode 175 are not connected to each other but are separated. That is, the common electrode 270 has the same shape as the fork, for example. The end portion of the common branch electrode 271 is bent at a predetermined angle. The bent angle is greater than the angle of the first curved portion, and may be close to the angle of the second curved portion. Depending on the case, the angle of the bent end portion may be greater than the angle of the second curved portion.

An opening 195 is defined in the pixel electrode that corresponds to the middle region of the common branch electrode 271. The opening 195 defined in the middle region includes a V-shaped first lateral side with a predetermined angle, a V-shaped second lateral side that is smaller than the first lateral side, and an upper side and a lower side for connecting the first lateral side and the second lateral side on a straight line. The angle of the first lateral side is the same as or similar to the angle of the second lateral side. The description regarding the opening 195 corresponds to the previous description.

An opening 195 is defined in the end portion of the common branch electrode 271. In an exemplary embodiment, the opening 195 has a quadrangular shape, for example, and the horizontal width of the opening 195 is greater than the width of the common branch electrode 271. The opening 195 is provided in parallel with the direction in which the common branch electrode 271 is bent, and one side edge of the common branch electrode 271 is separated from the edge of the opening 195 with a predetermined distance therebetween.

FIG. 14 shows an LCD in which a pixel electrode opening 195 is defined in a middle region and at both end portions of the common electrode 270. The LCD shown in FIG. 14 is similar to the LCD shown in FIG. 13. Similar constituent elements will not be described.

However, the LCD according to the exemplary embodiment shown in FIG. 14 additionally defines the opening 195 of the pixel electrode at the end portion that is near the drain electrode of the common electrode 270 compared to the exemplary embodiment shown in FIG. 13.

The opening 195 defined at the end portion that is near the drain electrode of the common electrode 270 is provided corresponding to the region that is bent with the angle that is greater than that of the first curved portion of the pixel electrode. The opening 195 includes respective lateral sides that proceed with the same angle as the bent angle of the common electrode 270 and upper and lower sides for connecting the lateral sides. The opening 195 may have a quadrangular shape or a parallelogram shape. The horizontal width of the opening 195 is somewhat greater than the width of the common branch electrode 271. Therefore, an edge of one lateral side of the common branch electrode 271 is separated from an edge of one side of the opening 195 by a predetermined distance.

The description regarding the opening 195 defined in the middle region of the common electrode 270 and the opening 195 defined at the opposite one end portion correspond to the description that is provided in the exemplary embodiment of FIGS. 12 and 13.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a transistor disposed on the first substrate, the transistor including a gate electrode, a semiconductor layer, a drain electrode and a source electrode;
a first electrode disposed to contact a part of the drain electrode and having a planar structure;
a passivation layer which covers the first electrode;
a second electrode disposed on the passivation layer, and including a plurality of second branch electrodes; and
a second substrate corresponding to the first substrate,
wherein an opening is defined in the first electrode in a position which corresponds to a middle region of a second branch electrode of the plurality of second branch electrodes, and
wherein the first electrode opening defined at the middle region of the second electrode includes a V-shaped first lateral side and a V-shaped second lateral side, a V-shaped angle of the V-shaped first lateral side and the V-shaped second lateral side is the same as the angle of a second curved portion of the second electrode.

2. The liquid crystal display of claim 1, wherein
the second branch electrode includes:
the first curved portion, and
a second curved portion which defines an angle which is greater than that of the first curved portion and is provided on one side of the second branch electrode in the middle region of the second branch electrode, and
the first curved portion defines an angle of about 3 degrees to about 7 degrees, and the second curved portion defines an angle of about 10 degrees to about 45 degrees.

3. The liquid crystal display of claim 2, wherein
the V-shaped second lateral side is the same as the angle of the second electrode second curved portion or a difference between the V-shaped angle and the angle of the second curved portion is less than about 5 degrees.

4. The liquid crystal display of claim 1, wherein the first electrode is a pixel electrode and the second electrode is a common electrode.

5. A liquid crystal display comprising:
a first substrate;
a transistor disposed on the first substrate, the transistor including a gate electrode, a semiconductor layer, a drain electrode and a source electrode;
a first electrode disposed to contact a part of the drain electrode and having a planar structure;
a passivation layer which covers the first electrode;
a second electrode disposed on the passivation layer, and including a plurality of second branch electrodes; and
a second substrate corresponding to the first substrate,
wherein
one end portion of a second branch electrode of the plurality of second branch electrodes is separated from one end portion of another second branch electrode of the plurality of second branch electrodes, and
an opening is defined in the first electrode at the separated one end portion of the second branch electrode,
wherein the first electrode opening is defined in parallel with a direction in which one the separated one end portion of the second branch electrode is bent, and
a horizontal width of the first electrode opening is greater than a width of the second branch electrode.

6. The liquid crystal display of claim 5, wherein
the second branch electrode includes:
a first curved portion, and
a second curved portion which defines an angle which is greater than that of the first curved portion and is provided on respective sides of the second branch electrode in the middle region of the second branch electrode, and
the separated one end portion of the second branch electrode is bent at a same angle of the second curved portion.

7. The liquid crystal display of claim 5, wherein the first electrode is a pixel electrode and the second electrode is a common electrode.

8. A liquid crystal display comprising:
a first substrate;
a transistor disposed on the first substrate, the transistor including a gate electrode, a semiconductor layer, a drain electrode and a source electrode;
a first electrode disposed to contact a part of the drain electrode and having a planar structure;
a passivation layer which covers the first electrode;
a second electrode disposed on the passivation layer, and including a plurality of second branch electrodes; and
a second substrate corresponding to the first substrate,
wherein
one end portion of a second branch electrode of the plurality of second branch electrodes are separated from one end portion of another second branch electrode of the plurality of second branch electrodes, and
an opening is defined in the first electrode corresponding to at least one of a middle region, the separated one end portion, and another connected one end portion of the second branch electrode,
wherein the first electrode opening defined at the middle region of the second electrode includes a V-shaped first lateral side and a V-shaped second lateral side, a V-shaped angle of the V-shaped first lateral side and the V-shaped second lateral side is the same as the angle of a second curved portion of the second electrode, and the first electrode opening defined at the separated one end portion of the second branch electrode is provided in parallel with a direction in which the separated one end portions of the second branch electrode is bent, and a horizontal width of the first electrode opening is greater than a width of the second branch electrode.

9. The liquid crystal display of claim 8, wherein
the second branch electrode includes:
a first curved portion, and
a second curved portion which defines an angle which is greater than that of the first curved portion and is provided on one side of the second branch electrode in the middle region of the second branch electrode,
the separated one end portion of the second branch electrode is bent at a same angle of the second curved portion, and
the first curved portion defines an angle of about 3 degrees to about 7 degrees, and the second curved portion defines an angle of about 10 degrees to about 45 degrees.

10. The liquid crystal display of claim 8, wherein the first electrode is a pixel electrode and the second electrode is a common electrode.

* * * * *